(12) United States Patent
Kadambi et al.

(10) Patent No.: US 12,249,101 B2
(45) Date of Patent: Mar. 11, 2025

(54) SENSOR FUSION BETWEEN RADAR AND OPTICALLY POLARIZED CAMERA

(71) Applicant: INTRINSIC INNOVATION LLC, Mountain View, CA (US)

(72) Inventors: Achuta Kadambi, Los Altos Hills, CA (US); Abhijit Ghosh, San Francisco, CA (US); Kartik Venkataraman, San Jose, CA (US); Agastya Kalra, Nepean (CA)

(73) Assignee: Intrinsic Innovation LLC, Mountain View, CA (US)

( * ) Notice: Subject to any disclaimer, the term of this patent is extended or adjusted under 35 U.S.C. 154(b) by 422 days.

(21) Appl. No.: 17/710,734

(22) Filed: Mar. 31, 2022

(65) Prior Publication Data

US 2023/0316571 A1 Oct. 5, 2023

(51) Int. Cl.
*G06T 7/80* (2017.01)
*G01S 13/68* (2006.01)
(Continued)

(52) U.S. Cl.
CPC .............. *G06T 7/80* (2017.01); *G01S 13/68* (2013.01); *G01S 13/867* (2013.01); *G06T 5/20* (2013.01);
(Continued)

(58) Field of Classification Search
CPC .... G06T 7/80; G06T 5/20; G06T 5/50; G06T 5/80; G06T 7/215; G06T 17/00; G06T 2207/10028; G06T 2207/20084; G06T 2207/20132; G06T 2207/20221; G06T 7/277; G01S 13/68; G01S 13/867
See application file for complete search history.

(56) References Cited

U.S. PATENT DOCUMENTS 11,295,475 B2 4/2022 Kalra et al.
11,302,012 B2 4/2022 Kalra et al.
(Continued)

FOREIGN PATENT DOCUMENTS

WO WO 2021/055585 3/2021

OTHER PUBLICATIONS

An et al., "Charuco board-based omnidirectional camera calibration method," Electronics, Dec. 11, 2018, 7(12):421.
(Continued)

*Primary Examiner* — Pinalben Patel
(74) *Attorney, Agent, or Firm* — Fish & Richardson P.C.

(57) ABSTRACT

A sensor system includes: a radar system configured to emit a radar beam and receive reflected radar signals from in a field of view of the radar system; a camera system including one or more cameras, at least one camera including a linear polarization filter in an optical axis of the camera, a field of view of the camera system overlapping the field of view of the radar system; and a processing system including a processor and memory, the memory storing instructions that, when executed by the processor, cause the processor to: receive radar data based on the reflected radar signals captured by the radar system; receive polarization raw frames captured by the camera system; and compute a track of a target in the field of view of the camera system and the field of view of the radar system based on the radar data and the polarization raw frames.

17 Claims, 10 Drawing Sheets

(51) Int. Cl.
  G01S 13/86    (2006.01)
  G06T 5/20     (2006.01)
  G06T 5/50     (2006.01)
  G06T 5/80     (2024.01)
  G06T 7/215    (2017.01)
  G06T 17/00    (2006.01)
(52) U.S. Cl.
  CPC .............. *G06T 5/50* (2013.01); *G06T 5/80* (2024.01); *G06T 7/215* (2017.01); *G06T 17/00* (2013.01); *G06T 2207/10028* (2013.01); *G06T 2207/20084* (2013.01); *G06T 2207/20132* (2013.01); *G06T 2207/20221* (2013.01)

(56) References Cited

U.S. PATENT DOCUMENTS

| | | | | |
|---|---|---|---|---|
| 2012/0081544 | A1* | 4/2012 | Wee | G01S 17/894 348/140 |
| 2016/0320476 | A1* | 11/2016 | Johnson | G06T 7/20 |
| 2017/0178399 | A1* | 6/2017 | Fest | G01J 4/04 |
| 2019/0333233 | A1* | 10/2019 | Hu | G01S 13/04 |
| 2021/0015926 | A1 | 1/2021 | Vergaelen et al. | |
| 2021/0356572 | A1* | 11/2021 | Kadambi | G06V 20/64 |
| 2022/0295038 | A1 | 9/2022 | Venkataraman et al. | |

OTHER PUBLICATIONS

Atkinson et al., "Recovery of surface orientation from diffuse polarization," IEEE transactions on image processing, Jun. 2006, 15(6):1653-1664.

Campbell et al., "Solving the Blind Perspective-n-Point Problem End-To-End With Robust Differentiable Geometric Optimization," European Conference on Computer Vision, Nov. 3, 2020, pp. 244-261.

Dosovitskiy et al., "FlowNet: Learning Optical Flow with Convolutional Networks," Proceedings of the IEEE International Conference on Computer Vision, 2015, pp. 2758-2766.

Drost et al., "Model globally, match locally: Efficient and robust 3D object recognition," 2010 IEEE Computer Society Conference on Computer Vision and Pattern Recognition, Jun. 13-18, 2010, pp. 998-1005.

Eddy et al., "FlowNet 2.0: Evolution of optical flow estimation with deep networks," Proceedings of the IEEE Conference on Computer Vision and Pattern Recognition (CVPR), 2017, pp. 2462-2470.

Garrido-Jurado et al., "Automatic generation and detection of highly reliable fiducial markers under occlusion," Pattern Recognition, Jun. 2014, 47(6):2280-2292.

Horn et al., "Determining optical flow," Artificial Intelligence, Aug. 1981, 17(1-3):185-203.

Kadambi et al., "Polarized 3D: High-Quality Depth Sensing with Polarization Cues," Proceedings of the IEEE International Conference on Computer Vision, 2015, pp. 3370-3378.

Kalra et al., "Deep polarization cues for transparent object segmentation," Proceedings of the IEEE/CVF Conference on Computer Vision and Pattern Recognition, 2020, pp. 8602-8611.

Lepetit et al., "EPnP: An accurate O(n) solution to the PnP problem," International Journal of Computer Vision, Jul. 19, 2008, 81(2):155-166.

Lin et al., "Microsoft COCO: Common objects in context," European Conference on Computer Vision, 2014, pp. 740-755.

Moller et al., "Fast, minimum storage ray-triangle intersection," Journal of Graphics Tools, 1997, 2(1):21-28.

Trabelsi et al., "A pose proposal and refinement network for better 6D object pose estimation," Proceedings of the IEEE/CVF Winter Conference on Applications of Computer Vision (WACV), 2021, pp. 2382-2391.

Wang et al., "Deep high-resolution representation learning for visual recognition," IEEE Transactions on Pattern Analysis and Machine Intelligence, Oct. 1, 2021, 43(1):3349-3364.

Welch et al., "An introduction to the Kalman filter," Dept. Comput. Sci., Univ. North Carolina, Chapel Hill, Tech. Rep., 1995, pp. 95-041.

Xiang et al., "PoseCNN: A convolutional neural network for 6D object pose estimation in cluttered scenes," CoRR, Nov. 1, 2017, arXiv:1711.00199, 10 pages.

Xu et al., "AANet: Adaptive aggregation network for efficient stereo matching," Proceedings of the IEEE/CVF Conference on Computer Vision and Pattern Recognition, 2020, pp. 1959-1968.

Zakharov et al., "DPOD: 6D Pose Object Detector and Refiner," 2019 IEEE/CVF International Conference on Computer Vision (ICCV), 2019, pp. 1941-1950.

Zhao et al., "Learning deep network for detecting 3D object keypoints and 6D poses," Proceedings of the IEEE/CVF Conference on Computer Vision and Pattern Recognition, 2020, pp. 14134-14142.

* cited by examiner

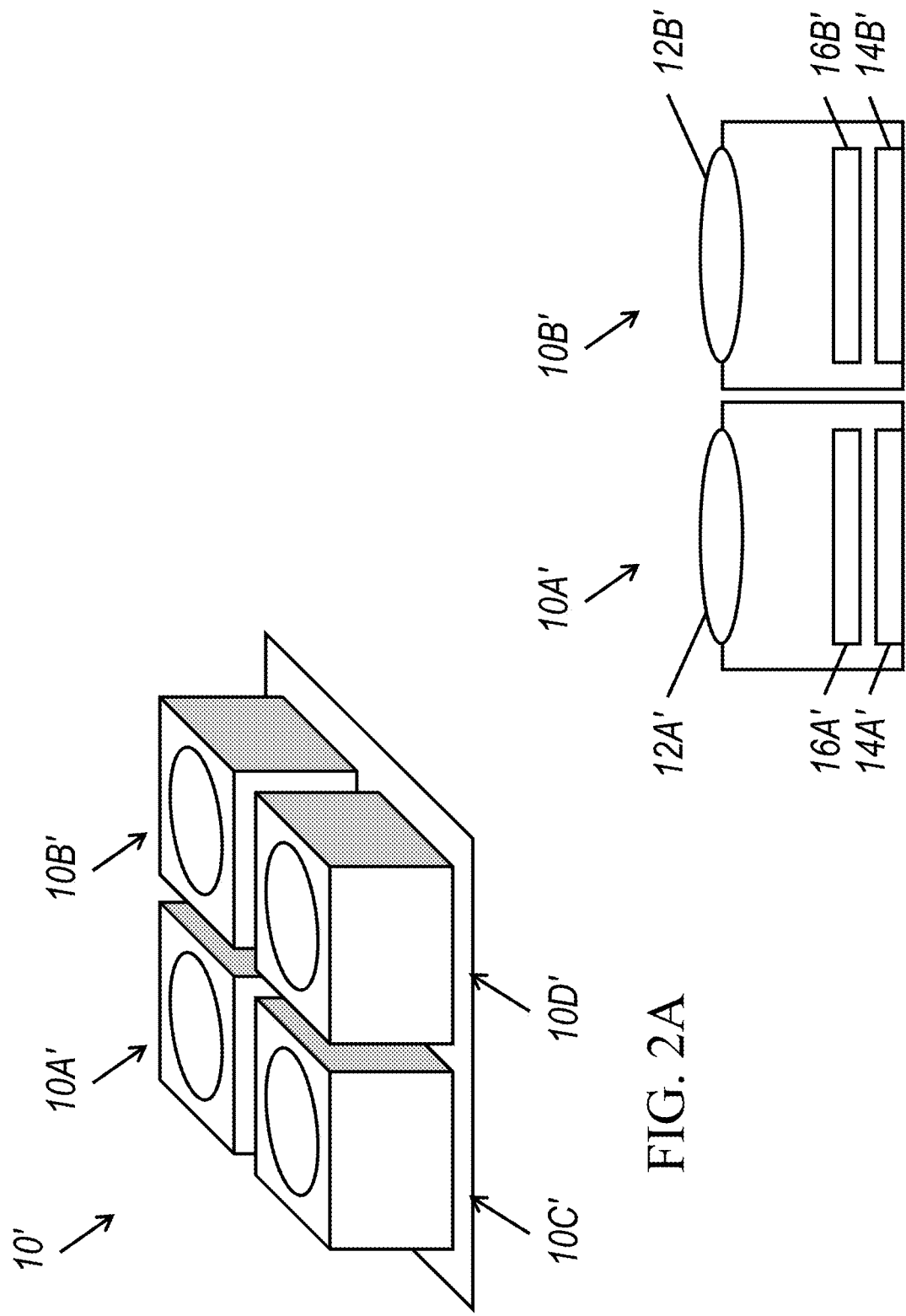

SENSOR FUSION BETWEEN RADAR AND OPTICALLY POLARIZED CAMERA

FIELD

Aspects of the present disclosure relate to the field of sensors, including the fusion of data from radar sensors and optically polarized imaging sensors or cameras.

BACKGROUND

Sensor fusion is critical for many applications, such as autonomous driving, robotic bin picking, robotic surgery, and the like, where combining input from multiple different sensors, including multiple types of sensors, provides better sensing performance than individual sensors working alone. One example is sensor fusion between radar data and optical camera data. While optical cameras typically have high spatial and axial resolution, optical systems are susceptible to scatter, clutter and occlusions. In contrast, radar sensors typically have lower spatial and axial resolution than optical cameras, but are less susceptible to occlusions and other sensing challenges.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure relate to the fusion of radar data with image data captured by optically polarized cameras, such as a camera having a polarizing filter in its optical axis.

According to one embodiment of the present disclosure, a sensor system includes: a radar system configured to emit a radar beam and receive reflected radar signals from in a field of view of the radar system; a camera system including one or more cameras, wherein at least one camera includes a linear polarization filter in an optical axis of the camera, a field of view of the camera system overlapping the field of view of the radar system; and a processing system including a processor and memory, the memory storing instructions that, when executed by the processor, cause the processor to: receive radar data based on the reflected radar signals captured by the radar system; receive polarization raw frames captured by the camera system; and compute a track of a target in the field of view of the camera system and the field of view of the radar system based on the radar data and the polarization raw frames.

The linear polarization filter may be at a first angle of linear polarization, wherein the one or more cameras may further include: a second camera having a second linear polarization filter at a second angle of linear polarization; and a third camera having a third linear polarization filter at a third angle of linear polarization, and wherein the first angle of linear polarization, the second angle of linear polarization, and the third angle of linear polarization may be different from one another.

The memory may store instructions that, when executed by the processor, cause the processor to: compute the track of the target based on a Kalman filter having a state including positional coordinates and kinematic coordinates of the target; and perform a predictive update of the state based on the radar data, the polarization raw frames, and a previous state.

The instructions to perform the predictive update of the state may include instructions that, when executed by the processor, cause the processor to: compute polarized optical flow of the target based on the polarization raw frames; and perform the predictive update based on the polarized optical flow.

The instructions to perform the predictive update of the state may include instructions that, when executed by the processor, cause the processor to: compute a shape estimate of the target based on supplying the polarization raw frames to a trained deep neural network; and perform the predictive update based on the shape estimate.

The memory may further store instructions that, when executed, cause the processor to: compute a region of interest based on the radar data; and crop the polarization raw frames to the region of interest.

The track of the target may be computed based on the radar data and the cropped polarization raw frames.

The memory may further store instructions that, when executed by the processor, cause the processor to compute shape data of the target based on the cropped polarization raw frames.

The memory may further store instructions that, when executed by the processor, cause the processor to: compute a six-degree-of-freedom pose of the target based on the cropped polarization raw frames.

The memory may further store instructions that, when executed by the processor, cause the processor to: compute a 3-D model of the target based on the cropped polarization raw frames.

The memory may further store instructions that, when executed by the processor, cause the processor to calibrate the radar system and the camera system by: transmitting the radar beam and receiving reflected radar signals from the field of view of the radar system; receiving radar data based on the reflected radar signals including radar signals reflected by a calibration target; receiving polarization raw frames captured by the camera system, the polarization raw frames including polarization images of the calibration target; calibrating the camera system and the radar system based on: the radar data based on the radar signals reflected by the calibration target; and the polarization images of the calibration target, the calibrating the camera system including computing: extrinsic parameters representing a geometric transformation between the field of view of the radar system and the field of view of the camera system.

According to one embodiment of the present disclosure, a method for fusing radar data and polarized image data includes: receiving, by a processor of a processing system, radar data based on reflected radar signals captured by a radar system configured to emit a radar beam and to detect the reflected radar signals from a field of view of the radar system; receiving, by the processor, polarization raw frames captured by a camera system including one or more cameras, at least one camera including a linear polarization filter in an optical axis of the camera, a field of view of the camera system overlapping the field of view of the radar system; and computing, by the processor, a track of a target in the field of view of the camera system and the field of view of the radar system based on the radar data and the polarization raw frames.

The linear polarization filter may be at a first angle of linear polarization, wherein the one or more cameras may further include: a second camera having a second linear polarization filter at a second angle of linear polarization; and a third camera having a third linear polarization filter at a third angle of linear polarization, and wherein the first angle of linear polarization, the second angle of linear polarization, and the third angle of linear polarization may be different from one another.

The method may further include: computing the track of the target based on a Kalman filter having a state including positional coordinates and kinematic coordinates of the target; and performing a predictive update of the state based on the radar data, the polarization raw frames, and a previous state.

The performing the predictive update of the state may include: computing polarized optical flow of the target based on the polarization raw frames; and performing the predictive update based on the polarized optical flow.

The performing the predictive update of the state may include: computing a shape estimate of the target based on supplying the polarization raw frames to a trained deep neural network; and performing the predictive update based on the shape estimate.

The method may further include: computing a region of interest based on the radar data; and cropping the polarization raw frames to the region of interest.

The track of the target may be computed based on the radar data and the cropped polarization raw frames.

The method may further include computing shape data of the target based on the cropped polarization raw frames.

The method may further include computing a six-degree-of-freedom pose of the target based on the cropped polarization raw frames.

The method may further include computing a 3-D model of the target based on the cropped polarization raw frames.

According to one embodiment of the present disclosure, a method for calibrating a sensing system including a radar system and a camera system includes: controlling a radar system to transmit a radar beam; receiving, from the radar system, radar data based on reflected radar signals including radar signals reflected by a calibration target detected in a field of view of the radar system; receiving polarization raw frames captured by a camera system including one or more cameras wherein at least one camera includes a linear polarization filter in an optical axis of the camera, the polarization raw frames including polarization images of the calibration target in a field of view of the camera system; calibrating the camera system and the radar system based on: the radar data based on the radar signals reflected by the calibration target; and the polarization images of the calibration target, the calibrating the camera system including computing: extrinsic parameters representing a geometric transformation between the field of view of the radar system and the field of view of the camera system.

BRIEF DESCRIPTION OF THE DRAWINGS

The accompanying drawings, together with the specification, illustrate exemplary embodiments of the present invention, and, together with the description, serve to explain the principles of the present invention.

FIG. 2A is a perspective view of a camera array according to one embodiment of the present disclosure.

FIG. 2B is a cross sectional view of a portion of a camera array according to one embodiment of the present disclosure.

DETAILED DESCRIPTION

Figure 1A:
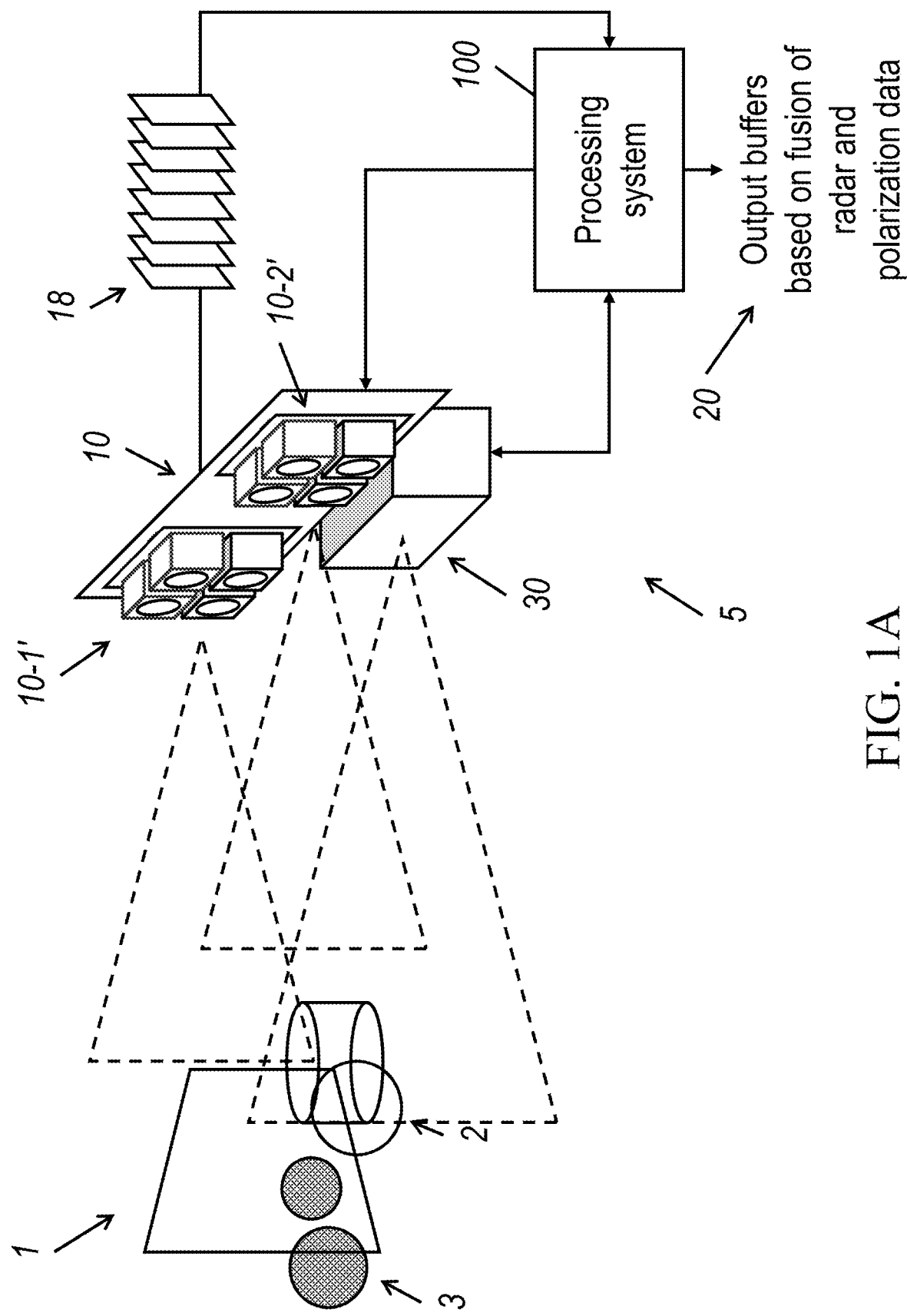
FIG. 1A is a schematic block diagram of an imaging system including a polarization camera array system and a radar sensor according to some embodiments of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present disclosure relate to the fusion of radar data with image data captured by optically polarized cameras, such as a camera having a polarizing filter in its optical axis. As used herein, "polarization" refers to the polarization state of an electromagnetic wave at optical, ultraviolet, or infrared wavelengths. It will be assumed herein that the radar system is unpolarized, although embodiments of the present disclosure are not limited thereto.

Camera systems generally operate in the visible portion of the electromagnetic spectrum as well as in the near-infrared. Computer vision relates to various image processing techniques that are used to derive semantic information from images captured by camera systems, such as the classification of images based on the objects depicted in the image, the segmentation of images into portions corresponding to different types and instances of objects, and the localization of ground planes and surfaces imaged by the camera system.

Radar-based sensors generally include an antenna or antenna array that is steerable, e.g., electronically steerable, to emit a radar beam (e.g., an electromagnetic signal) within a field of view of the radar antenna and that captures or detects reflections of the radar beam from surfaces in the environment.

Radar sensors provide a sensing modality that differs from camera systems. For example, certain environmental conditions, such as fog and clouds, haze, and the like may impede or prevent cameras from being able to capture useful information about the environment. In addition, image data alone many not be sufficient to detect motion (e.g., with a short exposure time, moving objects with little motion blur may be indistinguishable from stationary objects). In contrast, radar sensors typically operate at frequencies where fog and haze are transparent and therefore can continue to generate useful data under these circumstances, and are also able to separate or segment moving objects in a scene from static objects based on, for example, detecting doppler shifts in the radar signals reflected by objects.

An optically polarized camera provides more information than a camera without a polarizing filter (or polarization filter) at least because a polarizing filter can remove glare and because polarization data, such as the angle of linear polarization (AOLP) and the degree of linear polarization (DOLP) can be used to obtain the three-dimensional shapes of objects (such as by applying shape from polarization techniques). In addition, polarization data can be used to perform various computer vision tasks, such as image segmentation, robustly than can be done using only image data captured by unpolarized cameras (e.g., cameras that do not have polarizing filters). Polarization data is also capable of capturing information that can be provided as input to computer vision algorithms to successfully perform computer vision tasks, such as image segmentation, under material and lighting conditions where unpolarized cameras would fail, such as in the case of highly reflective surfaces, transparent surfaces, and matte dark or black surfaces.

Stereo camera systems provide one approach for implementing 3D scanning systems. A stereo camera system includes two or more cameras that are spaced apart from one another, thereby placing the cameras at different viewpoints with respect to a scene that is being imaged by the stereo camera system. The spatial vector between a given pair of cameras in a stereo camera system is referred to as a "baseline." The cameras generally have substantially overlapping fields of view (e.g., with substantially parallel optical axes, or where the optical axes substantially intersect at a point), such that the substantially the same objects of the scene are imaged by the different cameras of the stereo camera system.

Finding correspondences between images captured by a stereo camera system relates to determining which parts of one image correspond to which parts of another image. For example, when a stereo camera system images a scene containing a cube, finding correspondences may include determining which portions of the two images depict the same corner of the cube. Determining the locations of correspondences in different images captured by the stereo camera system may be used, for example, to stitch the separate images together (thereby creating an image with a wider field of view than the images captured by the individual cameras). Another application of detecting correspondences is to perform three-dimensional (3D) reconstruction of a scene, where the disparity of the correspondences (e.g., differences in the locations of the correspondences within their respective images) due to parallax shift is used to estimate a distance between the camera and the surface of the object in the scene (also referred to as a "depth" of the surface)—e.g., where larger disparities indicate surfaces that are closer to the camera and smaller disparities indicate surfaces that are farther from the camera. These 3D reconstructions of a scene may also be referred to as depth maps that include point clouds (e.g., collections of 3D points representing the detected locations of surfaces in the scene). Polarization information can be further used to enhance the accuracy of the depth maps captured using stereo cameras.

For example, the work described in Kadambi, Achuta, et al. "Polarized 3D: High-Quality Depth Sensing with Polarization Cues." *Proceedings of the IEEE International Conference on Computer Vision.* 2015 explored how coarse depth maps can be enhanced by using the shape information from polarization cues, in particular proposing a framework to combine surface normals from polarization (hereafter polarization normals) with an aligned depth map. In the Kadambi et al. paper, an initial aligned depth map was acquired using a time-of-flight 3D scanner (a Microsoft® Kinect® II). The work focused on how one could use polarization cues to enhance the acquired depth map, but did not perform a detailed investigation on how these depth maps could be acquired.

In some cases, these stereo images are provided directly as input to deep learning models (e.g., deep convolutional networks) that are trained to perform various computer vision tasks, such as image classification and image segmentation. These stereo images may also include polarized images (e.g., images or "polarization raw frames" of the same scene captured through different polarizing filters, such as linear polarization filters at different angles of linear polarization), as will be described in more detail below. In particular, in some embodiments, there is no intermediate step of explicitly computing a depth map or a point cloud based on stereo images, where the depth map or point cloud is then provided as an input to a trained machine learning model (e.g., a neural network).

In various circumstances, depth cameras may be referred to as active depth cameras systems, which include integrated illumination systems that emit light onto a scene imaged by the camera systems, and passive depth camera systems, which do not include integrated illumination systems and, instead, use ambient light. Active camera systems provide benefits in, for example, low light scenarios and can also assist in performing 3-D reconstruction of scenes by projecting light in particular patterns, such as projecting patterns that assist in finding correspondences or by projecting structured light. Some additional examples of active camera systems include time of flight (ToF) depth cameras that measure distances based on the time elapsed between emitting a light pulse and detecting the reflection of the light pulse off a surface in the scene at the camera system. Active depth camera systems may be less effective in environments where there is substantial ambient electromagnetic radiation in the spectrum of the active illumination system. For example, when using visible light or infrared illumination systems, it may be difficult to emit sufficient light to be detectable in outdoor environments under daylight (e.g., on a vehicle). In addition, the active illumination increases the energy requirements of such imaging systems to power the illumination system, especially under challenging circumstances (e.g., with high levels of ambient illumination).

Therefore, while an active illumination-based approach for 3D scanning, such as time-of-flight 3D scanning, may be suitable in some scenarios, a completely passive approach to acquiring robust and high-quality depth information is a desirable feature of 3D scanners, due to benefits such as reduced energy consumption and reduction in potential interference with other light sensitive devices in an environment (e.g., no powered active illumination source to emit visible or invisible light patterns).

As used herein, the term "viewpoint-independent" imaging refers to imaging modalities where the intensity of light (or magnitude of another detected signal) is substantially independent of the viewpoint. These may also be referred to imaging modalities that comply with a brightness constancy assumption. As used herein, a viewpoint-independent imaging modality refers to a modality in which the measured intensity of light reflecting off substantially diffuse surfaces imaged in a scene is viewpoint-independent. These viewpoint-independent imaging modalities may include, for example, a camera (e.g., visible light or infrared camera) that does not have a polarizing filter in its optical path. In practice, most surfaces in the real world do not exhibit ideal diffuse (e.g., Lambertian) reflectance and therefore will exhibit some degree of viewpoint dependence. For example, highly reflective surfaces (e.g., mirrors) and glossy or shiny surfaces (e.g., polished paint) may exhibit viewpoint-dependent reflections and specular highlights. Nevertheless, these imaging modalities will still be considered herein to be viewpoint-independent or compliant with the brightness constancy assumption.

Sensor System Architectures

FIG. 1A is a schematic block diagram of an imaging system including a polarization camera array system and a radar sensor according to some embodiments of the present disclosure. In the arrangement shown in FIG. 1A, a scene 1 includes transparent objects 2 (e.g., depicted as a ball such as a glass marble, a cylinder such as a drinking glass or tumbler, and a plane such as a pane of transparent acrylic) that are placed in front of opaque matte objects 3 (e.g., a baseball and a tennis ball). A sensing system 5 as shown in FIG. 1A includes a polarization camera array system 10 which, in turn, includes two camera arrays 10-1' and 10-2' with corresponding fields of view, where the camera arrays are oriented such that their fields of view overlap and encompass the scene 1.

The polarization camera array system 10 may be configured to capture multiple input images 18 (or raw frames) of the scene 1. In some embodiments, some of the raw frames 18 correspond to images taken behind a polarization filter or polarizer at different angles of linear polarization $\phi_{pol}$ (e.g., 0 degrees, 45 degrees, 90 degrees, or 135 degrees). Each of the raw frames 18 is captured by one of the camera arrays of the polarization camera array system 10 from approximately the same viewpoint with respect to the scene 1 (e.g., the images captured by one camera array 10-1' are captured from a substantially same first pose and first orientation, and the images captured by another camera array 10-2' are captured from a substantially same second pose and second orientation), as opposed to capturing the raw frames from disparate locations and orientations with respect to the scene 1. Some aspects of embodiments relate to correcting for differences in the poses of the cameras within a camera array through image registration based on known calibration parameters of the cameras, where the registration may be performed during sensor fusion, as described in more detail below. The polarization camera array system 10 may be configured to detect light in a variety of different portions of the electromagnetic spectrum, such as the human-visible portion of the electromagnetic spectrum, red, green, and blue portions of the human-visible spectrum, as well as human-invisible portions of the electromagnetic spectrum such as near-infrared, far-infrared, shortwave infrared (SWIR), thermal (longwave infrared or LWIR), ultraviolet, and radio frequency (e.g., using radar imaging). The raw frames 18 captured by the cameras of the stereo camera array system 10 are supplied to a processing circuit of a controller or processing system 100, described in more detail below.

In addition, the example sensing system 5 shown in FIG. 1A further includes a radar system 30 having antenna system (e.g., an antenna or antenna array) driven by a radar transceiver. The radar transceiver includes a signal generator that is configured to generate a radar signal (e.g., an electromagnetic signal in the form of a pulse or as a continuous wave, where the signal may be modulated in amplitude, phase, and/or frequency) that is supplied to the antenna system. The antenna system may be steered (e.g., mechanically or electronically steered) to direct a radar beam toward the scene 1. The antenna system of the radar system 30 receives reflections of the radar beam from the scene from a field of view that overlaps with the field of view of the polarization camera array system 10, such as by applying a bandpass filter to the output of the antenna system in a frequency range around the frequency of the generated radar signal. The radar system 30 may then process the received signal, such as by measuring a pulse envelope and performing measurements of the chirp and phase of the received signal. These radar data may then be further processed by a processing circuit of the radar system 30 (e.g., a digital signal processor). Radar data such as raw measurements and/or further processed radar data are provided to the processing circuit of the processing system 100 or controller 100.

In the embodiment shown in FIG. 1A, the processing system 100 or controller 100 receives both the raw frames (e.g., polarization raw frames) captured by the polarization camera array system 10 and the radar data 30. The processing system 100 is configured to generate output buffers or output data (e.g., output data streams) based on a fusion of the received radar data and the received polarization data. Some examples of output data include a track of a target (or a plurality of tracks targets), where each track includes a sequence of states, where each state represents, for example, position coordinates and kinematic (e.g., velocity) coordinates of a target within the field of view of the sensing system 5 (e.g., the fields of view of the polarization camera array system 10 and the radar system 30). In some embodiments, the output buffers include outputs of computer vision algorithms, such as classification, segmentation, shape information, and/or pose information of one or more targets in a scene, as described in more detail below.

According to various embodiments of the present disclosure, the processing system 100 (or controller 100) is implemented using one or more electronic circuits configured to perform various operations as described in more detail below. Types of electronic circuits may include a central processing unit (CPU), a graphics processing unit (GPU), an artificial intelligence (AI) accelerator (e.g., a vector processor, which may include vector arithmetic logic units configured efficiently perform operations common to neural networks, such dot products and softmax), a field programmable gate array (FPGA), an application specific integrated circuit (ASIC), a digital signal processor (DSP), or the like. For example, in some circumstances, aspects of embodiments of the present disclosure are implemented in program instructions that are stored in a non-volatile computer readable memory where, when executed by the electronic circuit (e.g., a CPU, a GPU, an AI accelerator, or combinations thereof), perform the operations described herein to compute a processing output 20, such as an instance segmentation map, from input polarization raw frames 18. The operations performed by the processing system 100 may be performed by a single electronic circuit (e.g., a single CPU, a single GPU, or the like) or may be allocated between multiple electronic circuits (e.g., multiple GPUs or a CPU in conjunction with a GPU). The multiple electronic circuits may be local to one another (e.g., located on a same die, located within a same package, located within a same embedded device or computer system, or connected through a local peripheral bus such as Universal Serial Bus (USB)) and/or may be remote from one other (e.g., in communication over a network such as a local personal area network such as Bluetooth®, over a local area network such as a local wired and/or wireless network, and/or over wide area network such as the internet, such a case where some operations are performed locally and other operations are performed on a server hosted by a cloud computing service). One or more electronic circuits operating to implement the processing system 100 may be referred to herein as a computer or a computer system, which may include memory storing instructions that, when executed by the one or more electronic circuits, implement the systems and methods described herein.

Polarization Imaging

Figure 1B:
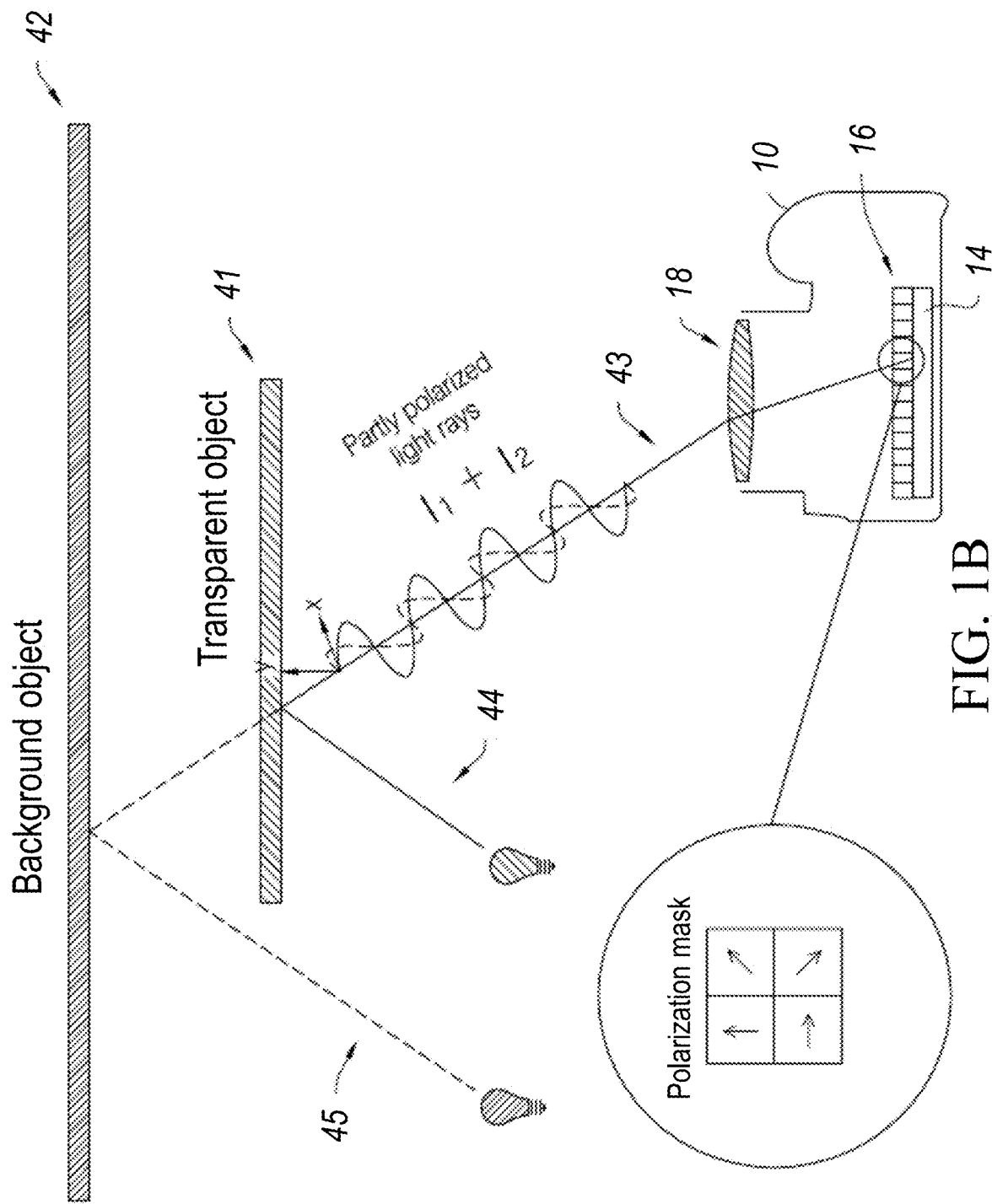
FIG. 1B is a high-level depiction of the interaction of light with transparent objects and non-transparent (e.g., diffuse and/or reflective) objects.

FIG. 1B is a high-level depiction of the interaction of light with transparent objects and non-transparent (e.g., diffuse and/or reflective) objects. As shown in FIG. 1B, a polarization camera 10 captures polarization raw frames of a scene that includes a transparent object 41 in front of an opaque background object 42. A light ray 43 hitting the image sensor 14 of the polarization camera 10 contains polarization information from both the transparent object 41 and the background object 42. The small fraction of reflected light 44 from the transparent object 41 is heavily polarized, and thus has a large impact on the polarization measurement, in contrast to the light 45 reflected off the background object 42 and passing through the transparent object 41.

Similarly, a light ray hitting the surface of an object may interact with the shape of the surface in various ways. For example, a surface with a glossy paint may behave substantially similarly to a transparent object in front of an opaque object as shown in FIG. 1B, where interactions between the light ray and a transparent or translucent layer (or clear coat layer) of the glossy paint causes the light reflecting off of the surface to be polarized based on the characteristics of the transparent or translucent layer (e.g., based on the thickness and surface normals of the layer), which are encoded in the light ray hitting the image sensor. Similarly, as discussed in more detail below with respect to shape from polarization (SfP) theory, variations in the shape of the surface (e.g., direction of the surface normals) may cause significant changes in the polarization of light reflected by the surface of the object. For example, smooth surfaces may generally exhibit the same polarization characteristics throughout, but a scratch or a dent in the surface changes the direction of the surface normals in those areas, and light hitting scratches or dents may be polarized, attenuated, or reflected in ways different than in other portions of the surface of the object. Models of the interactions between light and matter generally consider three fundamentals: geometry, lighting, and material. Geometry is based on the shape of the material. Lighting includes the direction and color of the lighting. Material can be parameterized by the refractive index or angular reflection/transmission of light. This angular reflection is known as a bi-directional reflectance distribution function (BRDF), although other functional forms may more accurately represent certain scenarios. For example, the bidirectional subsurface scattering distribution function (BSSRDF) would be more accurate in the context of materials that exhibit subsurface scattering (e.g. marble or wax).

A light ray 43 hitting the image sensor 14 of a polarization camera 10 has three measurable components: the intensity of light (intensity image/I), the percentage or proportion of light that is linearly polarized (degree of linear polarization/DOLP/ρ), and the direction of that linear polarization (angle of linear polarization/AOLP/ϕ). These properties encode information about the surface curvature and material of the object being imaged, which can be used by the processing system 100 to detect transparent objects, as described in more detail below. In some embodiments, by using one or more polarization cameras, the processing system 100 can detect other optically challenging objects based on similar polarization properties of light passing through translucent objects and/or light interacting with multipath inducing objects or by non-reflective objects (e.g., matte black objects).

In more detail, the polarization camera 10 may further includes a polarizer or polarizing filter or polarization mask 16 placed in the optical path between the scene 1 and the image sensor 14. According to various embodiments of the present disclosure, the polarizer or polarization mask 16 is configured to enable the polarization camera 10 to capture images of the scene 1 with the polarizer set at various specified angles (e.g., at 45° rotations or at 60° rotations or at non-uniformly spaced rotations).

As one example, FIG. 1B depicts an embodiment where the polarization mask 16 is a polarization mosaic aligned with the pixel grid of the image sensor 14 in a manner similar to a red-green-blue (RGB) color filter (e.g., a Bayer filter) of a color camera. In a manner similar to how a color filter mosaic filters incoming light based on wavelength such that each pixel in the image sensor 14 receives light in a particular portion of the spectrum (e.g., red, green, or blue) in accordance with the pattern of color filters of the mosaic, a polarization mask 16 using a polarization mosaic filters light based on linear polarization such that different pixels receive light at different angles of linear polarization (e.g., at 0°, 45°, 90°, and 135°, or at 0°, 60° degrees, and 120°). Accordingly, the polarization camera using a polarization mask 16 such as that shown in FIG. 1B is capable of concurrently or simultaneously capturing light at four different linear polarizations. One example of a polarization camera is the Blackfly® S Polarization Camera produced by FLIR® Systems, Inc. of Wilsonville, Oregon.

While the above description relates to some possible implementations of a polarization camera using a polarization mosaic, embodiments of the present disclosure are not limited thereto and encompass other types of polarization cameras that are capable of capturing images at multiple different polarizations. For example, the polarization mask 16 may have fewer than four polarizations or more than four different polarizations, or may have polarizations at different angles than those stated above (e.g., at angles of polarization of: 0°, 60°, and 120° or at angles of polarization of 0°, 30°, 60°, 90°, 120°, and 150°). As another example, the polarization mask 16 may be implemented using an electronically controlled polarization mask, such as an electro-optic modulator (e.g., may include a liquid crystal layer), where the polarization angles of the individual pixels of the mask may be independently controlled, such that different portions of the image sensor 14 receive light having different polarizations. As another example, the electro-optic modulator may be configured to transmit light of different linear polarizations when capturing different frames, e.g., so that the camera captures images with the entirety of the polarization mask set to, sequentially, to different linear polarizer angles (e.g., sequentially set to: 0 degrees; 45 degrees; 90 degrees; or 135 degrees). As another example, the polarization mask 16 may include a polarizing filter that rotates mechanically, such that different polarization raw frames are captured by the polarization camera 10 with the polarizing filter mechanically rotated with respect to the lens 18 to transmit light at different angles of polarization to image sensor 14. Furthermore, while the above examples relate to the use of a linear polarizing filter, embodiments of the present disclosure are not limited thereto and also include the use of polarization cameras that include circular polarizing filters (e.g., linear polarizing filters with a quarter wave plate). Accordingly, in various embodiments of the present disclosure, a polarization camera uses a polarizing filter to capture multiple polarization raw frames at different polarizations of light, such as different linear polarization angles and different circular polarizations (e.g., handedness).

As a result, the polarization camera 10 captures multiple input images (or polarization raw frames) of the scene including the surfaces of the objects 22. In some embodiments, each of the polarization raw frames corresponds to an image taken behind a polarization filter or polarizer at a different angle of polarization $\phi_{pol}$ (e.g., 0 degrees, 45 degrees, 90 degrees, or 135 degrees). Each of the polarization raw frames is captured from substantially the same pose with respect to the scene 1 (e.g., the images captured with the polarization filter at 0 degrees, 45 degrees, 90 degrees, or 135 degrees are all captured by a same polarization camera 10 located at a same location and orientation), as opposed to capturing the polarization raw frames from disparate locations and orientations with respect to the scene. The polarization camera 10 may be configured to detect light in a variety of different portions of the electromagnetic spectrum, such as the human-visible portion of the electromagnetic spectrum, red, green, and blue portions of the human-visible spectrum, as well as invisible portions of the electromagnetic spectrum such as infrared and ultraviolet.

FIG. 2A is a perspective view of a camera array 10' according to one embodiment of the present disclosure. FIG. 2B is a cross sectional view of a portion of a camera array 10' according to one embodiment of the present disclosure. Some aspects of embodiments of the present disclosure relate to a camera array in which multiple cameras (e.g., cameras having different imaging modalities and/or sensitivity to different spectra) are arranged adjacent to one another and in an array and may be controlled to capture images in a group (e.g., a single trigger may be used to control all of the cameras in the system to capture images concurrently or substantially simultaneously). In some embodiments, the individual cameras are arranged such that parallax shift between cameras is substantially negligible based on the designed operating distance of the camera system to objects 2 and 3 in the scene 1, where larger spacings between the cameras may be tolerated when the designed operating distance is large.

FIG. 2B shows a cross sectional view of two of the cameras 10A' and 10B' of the camera array 10' shown in FIG. 2A. As seen in FIG. 2B, each camera (10A' and 10B') includes a corresponding lens, a corresponding image sensor, and may include one or more corresponding filters. For example, in some embodiments, camera 10A' is a visible light color camera that includes lens 12A', image sensor 14A', and color filter 16A' (e.g., a Bayer filter). In the embodiment shown in FIG. 2B, the filter 16 is located behind the lens 12 (e.g., between the lens 12 and the image sensor 14), but embodiments of the present disclosure are not limited thereto. In some embodiments, the filter 16 is located in front of the lens 12, and in some embodiments, the filter 16 may include multiple separate components, where some components are located in front of the lens and other components are located behind the lens (e.g., a polarizing filter in front of the lens 12 and a color filter behind the lens 12). In some embodiments, camera 10B' is a polarization camera that includes lens 12B', image sensor 14B', and polarizing filter 16B' (a polarization camera may also include a visible light color filter or other filter for passing a particular portion of the electromagnetic spectrum, such as an infrared filter, ultraviolet filter, and the like). In some embodiments of the present disclosure, the image sensors four cameras 10A', 10B', 10C', and 10D' are monolithically formed on a same semiconductor die, and the four cameras are located in a same housing with separate apertures for the lenses 12 corresponding to the different image sensors. Similarly, the filters 16 may correspond to different portions of a single physical layer that has different optical filter functions (e.g., different linear polarizing angles or circular polarizers, color filters with corresponding spectral response functions, and the like) in different regions of the layer (corresponding to the different cameras). In some embodiments, a filter 16 of a polarization camera includes a polarization mask 16 similar to the Sony® IMX250MZR sensor, which includes a polarization mosaic aligned with the pixel grid of the image sensor 14 in a manner similar to a red-green-blue (RGB) color filter (e.g., a Bayer filter) of a color camera. In a manner similar to how a color filter mosaic filters incoming light based on wavelength such that each pixel in the image sensor 14 receives light in a particular portion of the spectrum (e.g., red, green, or blue) in accordance with the pattern of color filters of the mosaic, a polarization mask 16 using a polarization mosaic filters light based on linear polarization such that different pixels receive light at different angles of linear polarization (e.g., at 0°, 45°, 90°, and 135°, or at 0°, 60° degrees, and 120°). Accordingly, a camera of the camera array 10' may use a polarization mask 16 to concurrently or simultaneously capture light at four different linear polarizations.

In some embodiments, a demosaicing process is used to compute separate red, green, and blue channels from the raw data. In some embodiments of the present disclosure, each polarization camera may be used without a color filter or with filters used to transmit or selectively transmit various other portions of the electromagnetic spectrum, such as infrared light.

Some additional examples of polarization camera array systems suitable for use with embodiments of the present disclosure are described in U.S. patent application Ser. No. 17/198,142 "MULTI-MODAL AND MULTI-SPECTRAL STEREO CAMERA ARRAYS," filed on Mar. 10, 2021 and PCT Publication No. WO 2021/055585 "SYSTEMS AND METHODS FOR SURFACE MODELING USING POLARIZATION CUES," filed on Sep. 17, 2020, the entire disclosures of which are incorporated by reference herein.

As one example, in some embodiments, the first camera 10A' is a visible light camera that is configured to capture color images in a visible portion of the electromagnetic spectrum, such as by including a Bayer color filter 16A' (and, in some cases, a filter to block infrared light), and the second camera 10B', third camera 10C', and fourth camera 10D' are polarization cameras having different polarization filters, such filters having linear polarization angles of 0°, 60°, and 120°, respectively. The polarizing filters in the optical paths of each of the cameras in the array cause differently polarized light to reach the image sensors of the cameras. The individual polarization cameras in the camera array have optical axes that are substantially parallel to one another, are placed adjacent to one another, and have substantially the same field of view, such that the cameras in the camera array capture substantially the same view of a scene as the visible light camera 10A', but with different polarizations. While the embodiment shown in FIG. 2A includes a 2×2 array of four cameras, three of which are polarization cameras, embodiments of the present disclosure are not limited thereto, and the camera array may more than three polarization cameras, each having a polarizing filter with a different polarization state (e.g., a camera array may have four polarization cameras along with the visible light color camera 10A', where the polarization cameras may have polarization filters with angles of linear polarization, such as 0°, 45°, 90°, and 135°). In some embodiments, one or more of the cameras may include a circular polarizer.

For example, in the embodiment of the camera array 10' shown in FIG. 2A, four cameras 10A', 10B', 10C', and 10D' are arranged in a 2×2 grid to form a camera array, referred to herein as a camera array, where the four cameras have substantially parallel optical axes. The four cameras may be controlled together such that they capture images substantially simultaneously. In some embodiments, the four cameras are configured to capture images using the same exposure settings (e.g., same aperture, length of exposure, and gain or "ISO" settings). In some embodiments, the exposure settings for the different cameras can be controlled independently from one another (e.g., different settings for each camera), where the processing system 100 jointly or holistically sets the exposure settings for the cameras based on the current conditions of the scene 1 and the characteristics of the imaging modalities and spectral responses of the cameras 10A', 10B', 10C', and 10D' of the camera array 10'.

In some embodiments, the various individual cameras of the camera array are registered with one another by determining their relative poses (or relative positions and orientations) by capturing multiple images of a calibration target, such as a checkerboard pattern, an ArUco target (see, e.g., Garrido-Jurado, Sergio, et al. "Automatic generation and detection of highly reliable fiducial markers under occlusion." *Pattern Recognition* 47.6 (2014): 2280-2292.) or a ChArUco target (see, e.g., An, Gwon Hwan, et al. "Charuco board-based omnidirectional camera calibration method." *Electronics* 7.12 (2018): 421.). In particular, the process of calibrating the targets may include computing intrinsic matrices characterizing the internal parameters of each camera (e.g., matrices characterizing the focal length, image sensor format, and principal point of the camera) and extrinsic matrices characterizing the pose of each camera with respect to world coordinates (e.g., matrices for performing transformations between camera coordinate space and world or scene coordinate space). Different cameras within a camera array may have image sensors with different sensor formats (e.g., aspect ratios) and/or different resolutions without limitation, and the computed intrinsic and extrinsic parameters of the individual cameras enable the processing system 100 to map different portions of the different images to a same coordinate space (where possible, such as where the fields of view overlap).

Figure 2C:
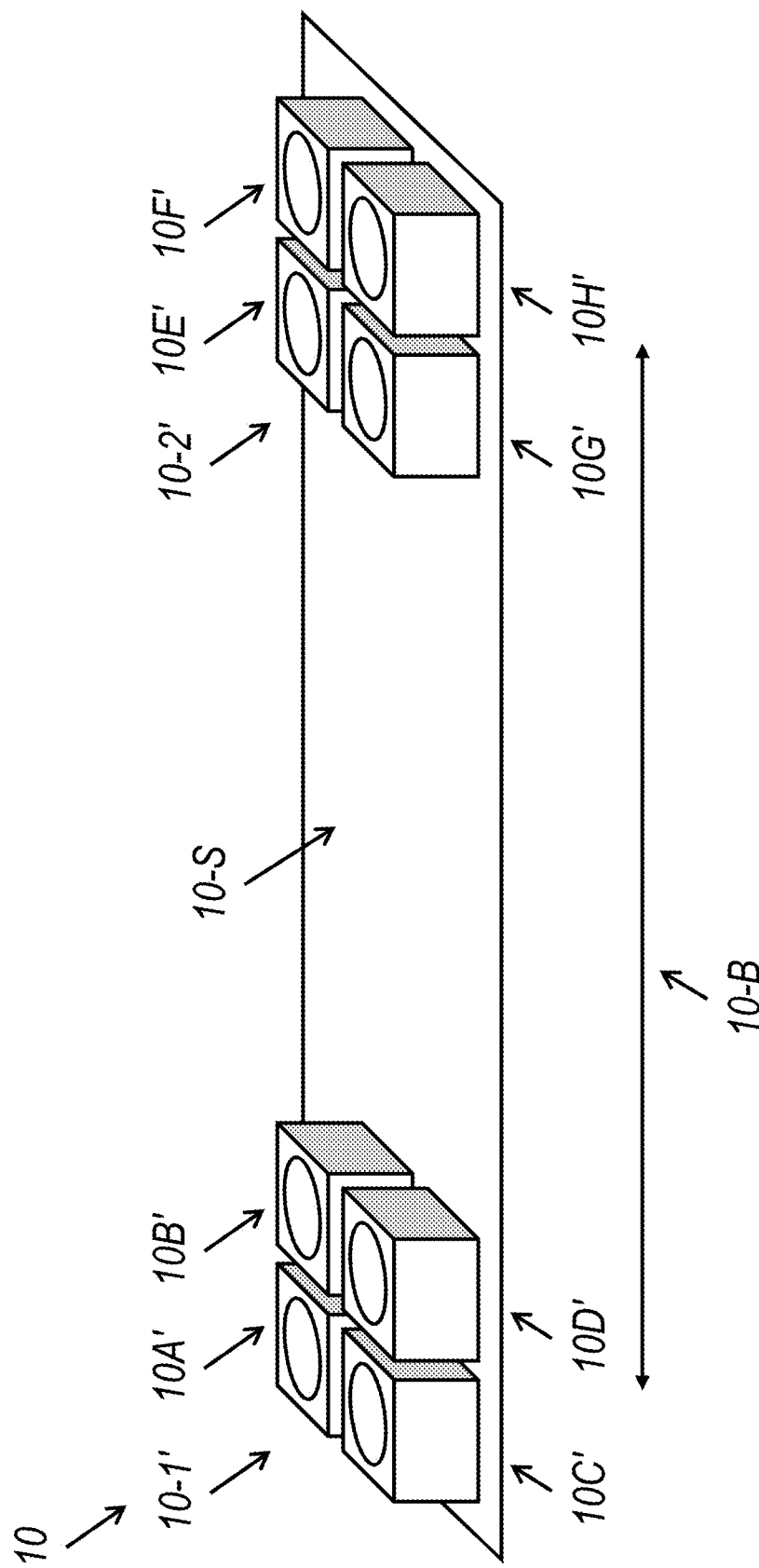
FIG. 2C is a perspective view of a stereo camera array system according to one embodiment of the present disclosure.

FIG. 2C is a perspective view of a stereo polarization camera array system 10 according to one embodiment of the present disclosure. For some applications, stereo vision techniques are used to capture multiple images of scene from different perspectives. As noted above, in some embodiments of the present disclosure, individual cameras (or camera modules) within a camera array 10' are placed adjacent to one another such that parallax shifts between the cameras are small or substantially negligible based on the designed operating distance of the camera system to the subjects being imaged (e.g., where the parallax shifts between cameras of a same array are less than a pixel for objects at the operating distance). In addition, as noted above, in some embodiments, differences in the poses of the individual cameras within a camera array 10' are corrected through image registration based on the calibrations (e.g., computed intrinsic and extrinsic parameters) of the cameras such that the images are aligned to a same coordinate system for the viewpoint of the camera array.

In stereo camera array systems according to some embodiments, the camera arrays are spaced apart from one another such that parallax shifts between the viewpoints corresponding to the camera arrays are detectable for objects in the designed operating distance of the camera system. This enables the distances to various surfaces in a scene (the "depth") to be detected in accordance with a disparity measure or a magnitude of a parallax shift (e.g., larger parallax shifts in the locations of corresponding portions of the images indicate that those corresponding portions are on surfaces that are closer to the camera system and smaller parallax shifts indicate that the corresponding portions are on surfaces that are farther away from the camera system). These techniques for computing depth based on parallax shifts are sometimes referred to as Depth from Stereo Accordingly, FIG. 2C depicts a stereo polarization camera array system 10 having a first camera array 10-1' and a second camera array 10-2' having substantially parallel optical axes and spaced apart along a baseline 10-B. In the embodiment shown in FIG. 2C, the first camera array 10-1' includes cameras 10A', 10B', 10C', and 10D' arranged in a 2×2 array similar to that shown in FIG. 2A and FIG. 2B. Likewise, the second camera array 10-2' includes cameras 10E', 10F', 10G', and 10H' arranged in a 2×2 array, and the stereo polarization camera array system 10 includes eight individual cameras (e.g., eight separate image sensors behind eight separate lenses). In some embodiments of the present disclosure, corresponding cameras of the camera arrays 10-1' and 10-2' are of the same type or, in other words, configured to capture raw frames or images using substantially the same imaging modalities or in substantially the same spectra. In the specific embodiment shown in FIG. 2C, cameras 10A' and 10E' may be of a same first type, cameras 10B' and 10F' may be of a same second type, cameras 10C' and 10G' may be of a same third type, and cameras 10D' and 10H' may be of a same fourth type. For example, in the embodiment shown in FIG. 2D, cameras 10A' and 10E' may both have linear polarizing filters at a same angle of 0°, cameras 10B' and 10F' may both have linear polarizing filters at a same angle of 45°, cameras 10C' and 10G' may both be viewpoint-independent cameras having no polarization filter (NF), such as near-infrared cameras, and cameras 10D' and 10H' may both have linear polarizing filters at a same angle of 90°. As another example, cameras 10A' and 10E' may both be viewpoint-independent cameras such as visible light cameras without polarization filters, cameras 10B' and 10F' may both be thermal cameras, cameras 10C' and 10G' may both have polarization masks with a mosaic pattern polarization filters at different angles of polarization (e.g., a repeating pattern with polarization angles of 0°, 45°, 90°, and 135°), and cameras 10D' and 10H' may both be thermal (LWIR) cameras.

While some embodiments are described above wherein each array includes cameras of different types in a same arrangement, embodiments of the present disclosure are not limited thereto. For example, in some embodiments, the arrangements of cameras within a camera array are mirrored along an axis perpendicular to the baseline 10-B. For example, cameras 10A' and 10F' may be of a same first type, cameras 10B' and 10E' may be of a same second type, cameras 10C' and 10H' may be of a same third type, and cameras 10D' and 10G' may be of a same fourth type.

In a manner similar to that described for calibrating or registering cameras within a camera array, the various polarization camera arrays of a stereo camera array system may also be registered with one another by capturing multiple images of calibration targets and computing intrinsic and extrinsic parameters for the various camera arrays. The camera arrays of a stereo polarization camera array system 10 may be rigidly attached to a common rigid support structure 10-S in order to keep their relative poses substantially fixed (e.g., to reduce the need for recalibration to recompute their extrinsic parameters). The baseline 10-B between camera arrays is configurable in the sense that the distance between the camera arrays may be tailored based on a desired or expected operating distance to objects in a scene—when the operating distance is large, the baseline 10-B or spacing between the camera arrays may be longer, whereas the baseline 10-B or spacing between the camera arrays may be shorter (thereby allowing a more compact stereo camera array system) when the operating distance is smaller.

While embodiments of stereo camera array systems shown in FIGS. 1, 2A, 2B, and 2C include two polarization camera arrays spaced apart along a baseline, and where each camera array includes four cameras, embodiments of the present disclosure are not limited thereto.

Capture and Fusion of Radar Data and Image Data

Aspects of embodiments of the present disclosure relate to the capture and fusion of radar data and polarized image data as captured by a polarized imager such as a polarization camera array system described above. Polarization data is more useful than ordinary camera data (e.g., camera image data captured without a polarizer) because it can remove glare, obtain 3D shape of objects, and perform computer vision tasks with more robustness than ordinary, unpolarized vision systems. Polarization data also works on material and lighting conditions where ordinary cameras fail.

The basic processing pipeline for involves state estimation (e.g., estimation of position and velocity of targets in the field of view of the sensor system), calibration of the sensor system, fusion of radar data with polarized image data, and classification of targets (e.g., extraction of semantic information regarding the targets based on the radar data and the polarized image data).

Figure 3:
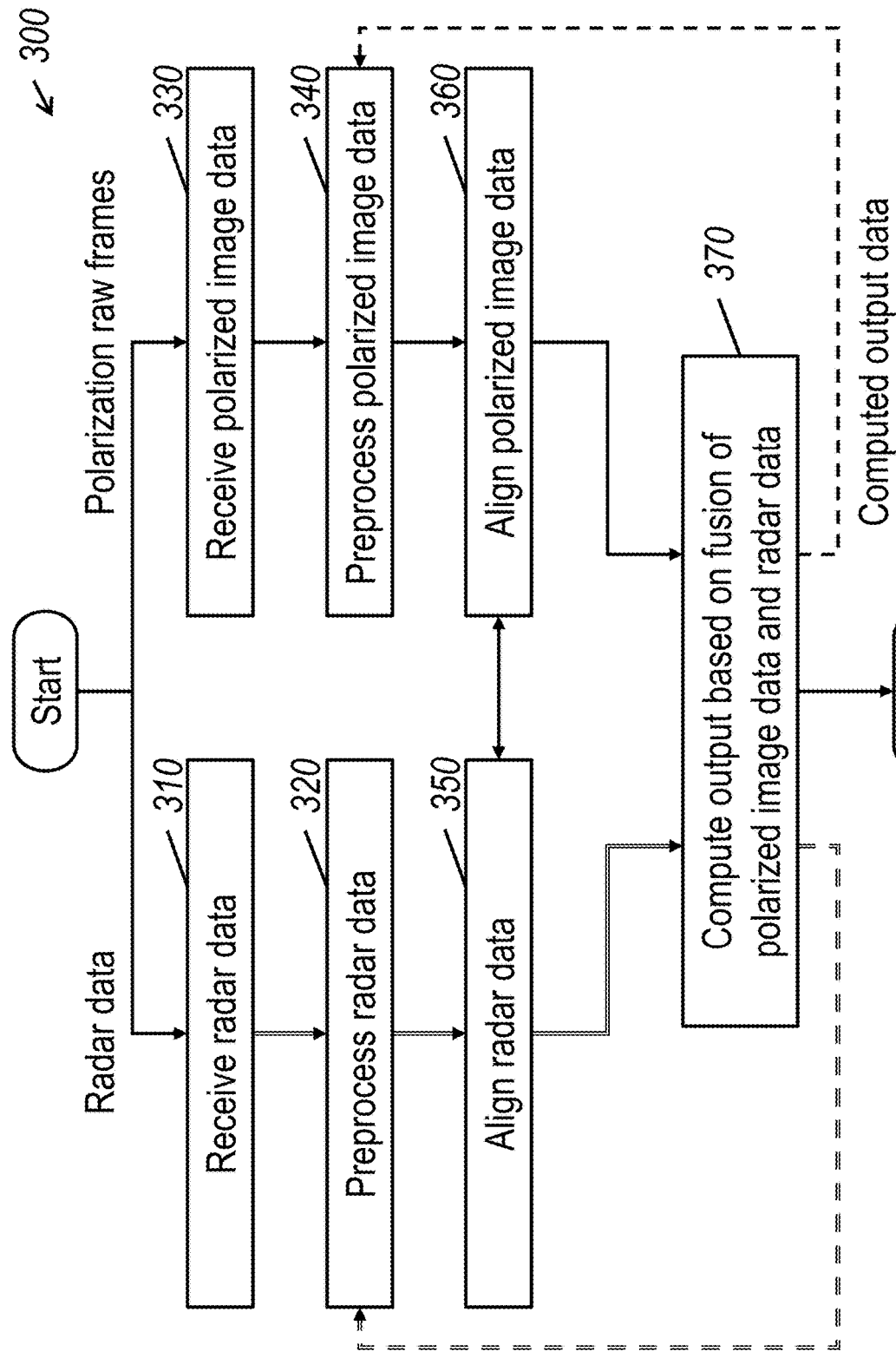
FIG. 3 is a flowchart depicting a method for fusing radar data and polarized image data according to one embodiment of the present disclosure.

FIG. 3 is a flowchart depicting a method 300 for fusing radar data and polarized image data according to one embodiment of the present disclosure. In some embodiments, the method 300 is performed by a processing circuit such as a processing circuit of a processing system 100 shown in FIG. 1A, where the processing system 100 is configured to receive polarized image data (e.g., polarization raw frames) and radar data from a polarization camera array system 10 and a radar system 30, respectively.

In some embodiments, the processing system 100 controls a radar system 30 and a polarization camera system (e.g., a polarization camera array system 10) to capture radar data and polarization data, respectively, such as by transmitting commands to the radar system 30 and the polarization camera system to start and stop a capture process and/or configure parameters of the capture process. For example, the commands may control controlling the frame rate or capture time of the polarization camera system, control exposure settings (e.g., exposure time, aperture, and gain) of the polarization camera system, controlling the emission of a radar beam by the radar system 30, control a mode of operation of the radar system 30, and the like.

In some embodiments, the processing circuit does not actively control the polarization camera array system 10 and the radar system 30, but instead, receives input polarization image data and radar data from the respective sensors automatically. For example, the polarization camera array system 10 may automatically capture images or polarization raw frames at a particular frame rate and automatically transmit the captured images to the processing circuit as they are captured. Likewise, the radar system 30 may be configured to automatically and periodically transmit a radar beam, capture reflected radar signals, and transmit the radar data to the processing circuit as the radar data is captured and generated.

At operation 310, the processing system 100 receives radar data from the radar system 30. Radar system generally can have multiple types of outputs. As a non-limiting example, some aspects of embodiments will be described in the context of a radar system that outputs data streams in a data structure known as a track or tracks. Other examples of radar data include radar images generated by performing waveform inversion on the time-domain radar data to generate two dimensional images where the dimensions of the image correspond to spatial dimensions (in some embodiments, generation of radar images is performed by the processing system 100 as part of the preprocessing operation 320 instead of by the radar system 30). Another type of radar data is a tensor structure corresponding to a spatial dimension and one or more time dimensions. In some implementations, each entry of this tensor is a complex number and can represent a magnitude and phase component (e.g., as represented by real and imaginary components of the complex number entry). Often, some implementations include two time components, where one component is a "fast time" axis, which represents the time delay of an emitted chirp. Another axis can be a "slow time" axis which represents timeslots from multiple emitted pulses. For each target detected by the radar system 30, a track data structure collates one or more states of a target, where each state represents, for example, the velocity, bearing, and position of the target (e.g., an object moving through the scene) at a particular time point or timestamp.

In some embodiments, at operation 320, the processing system 100 performs preprocessing on the radar data (e.g., the tracks). In some embodiments, the processing system determines whether individual data points or states in the tracks are real detections corresponding to a real-world target or a spurious detection (e.g., a false positive). For example, in some embodiments, anomaly detection algorithms are used to remove spurious detections from the data (e.g., by detecting outliers that are inconsistent with the majority of other radar data received from the radar system 30).

In some embodiments, the preprocessing at operation 320 includes classifying individual tracks corresponding to particular targets as dynamic (e.g., where the velocity is non-zero, thereby corresponding to a moving target) or static (e.g., where the velocity is zero, thereby corresponding to a static or stationary object). In some embodiments, the preprocessing at operation 320 includes generating a hierarchical structure of confidence for a radar track, such as by analyzing the signal amplitude in context of the object size for confidence that the signal amplitude is consistent with the object size of the target.

In some embodiments, the processing system 100 also performs signal clean-up during the preprocessing at operation 320, e.g., through the use of denoising or smoothing filters or the radar data.

At operation 330, the processing system receives polarized image data, such as polarization raw frames (e.g., images captured by a camera having a polarization filter in its optical axis), captured by the polarized camera system.

At operation 340, the processing system 100 preprocesses the polarized image data to generate preprocessed polarized image data (or features or tensors) based on polarization raw frames. In some embodiments, standard image processing techniques may be applied to the polarized image data, such as by applying a filter to the data (e.g., edge detection, contrast modification, blurring or smoothing filters, etc.).

In some embodiments, the processing system 100 further performs polarization image processing on the polarized image data (e.g., the polarization raw frames). For example, in some embodiments the processing system 100 computes an angle of linear polarization (AOLP) and/or a degree of linear polarization (DOLP) based on the polarization raw frames.

As noted above with respect to FIG. 1B, a light ray 43 hitting the image sensor 14 of a polarization camera 10 has three measurable components: the intensity of light (intensity image/I), the percentage or proportion of light that is linearly polarized (degree of linear polarization/DOLP/p), and the direction of that linear polarization (angle of linear polarization/AOLP/p).

Measuring intensity I, DOLP ρ, and AOLP ϕ at each pixel requires 3 or more polarization raw frames of a scene taken behind polarizing filters (or polarizers) at different angles, $\phi_{pol}$ (e.g., because there are three unknown values to be determined: intensity I, DOLP ρ, and AOLP ϕ. For example, a polarization camera such as those described above with respect to FIGS. 1B, 1C, 1D, and 1E captures polarization raw frames with four different polarization angles $\phi_{pol}$, e.g., 0 degrees, 45 degrees, 90 degrees, or 135 degrees, thereby producing four polarization raw frames $I_{\phi_{pol}}$, denoted herein as $I_0$, $I_{45}$, $I_{90}$, and $I_{135}$.

The relationship between $I_{\phi_{pol}}$ and intensity I, DOLP ρ, and AOLP ϕ at each pixel can be expressed as:

$$I_{\phi_{pol}} = I(1 + \rho \cos(2(\phi - \phi_{pol}))) \quad (1)$$

Accordingly, with four different polarization raw frames $I_{\phi_{pol}}$ ($I_0$, $I_{45}$, $I_{90}$, and $I_{135}$), a system of four equations can be used to solve for the intensity I, DOLP ρ, and AOLP ϕ.

In addition, in some embodiments, during preprocessing at operation 340, the processing system computes a shape of a scene or a target (e.g., the direction of the surface normals of the target). Shape from Polarization (SfP) theory (see, e.g., Gary A. Atkinson and Edwin R. Hancock. Recovery of surface orientation from diffuse polarization. IEEE transactions on image processing, 15(6):1653-1664, 2006.) states that the relationship between the refractive index (n), azimuth angle ($\theta_a$) and zenith angle ($\theta_z$) of the surface normal of an object and the ϕ and ρ components of the light ray coming from that object follow the following characteristics when diffuse reflection is dominant:

$$\rho = \frac{\left(n - \frac{1}{n}\right)^2 \sin^2(\theta_z)}{2 + 2n^2 - \left(n + \frac{1}{n}\right)^2 \sin^2\theta_z + 4\cos\theta_z\sqrt{n^2 - \sin^2\theta_z}} \quad (2)$$

$$\phi = \theta_a \quad (3)$$

and when the specular reflection is dominant:

$$\rho = \frac{2\sin^2\theta_z \cos\theta_z \sqrt{n^2 - \sin^2\theta_z}}{n^2 - \sin^2\theta_z - n^2\sin^2\theta_z + 2\sin^4\theta_z} \quad (4)$$

$$\phi = \theta_a - \frac{\pi}{2} \quad (5)$$

Note that in both cases ρ increases exponentially as $\theta_z$ increases and if the refractive index is the same, specular reflection is much more polarized than diffuse reflection.

Accordingly, some aspects of embodiments of the present disclosure relate to applying SfP theory to detect or measure the gradients of surfaces (e.g., the orientation of surfaces or their surface normals or directions perpendicular to the surfaces) based on the raw polarization frames of the objects, as captured by the polarization cameras among the of the polarization camera array system including any support cameras located at other viewpoints with respect to the scene. Computing these gradients produces a gradient map (or slope map or surface normals map) identifying the slope of the surface depicted at each pixel in the gradient map. These gradient maps can then be used when estimating the pose of the object by aligning a pre-existing 3-D model (e.g., CAD model) of the object with the measured surface normals (gradients or slopes) of the object in based on the slopes of the surfaces of the 3-D model, as described in more detail below.

In some embodiments, the processing system 100 crops the polarized image data to select particular regions of interest (ROI) for analysis.

As shown by the dashed line from operation 370 back to operation 340, in some embodiments, the polarized data preprocessing operation at 340 takes state input from a previous frame (e.g., computed from earlier radar data and polarization raw frames supplied as input to the processing system).

In some embodiments, this state input is used to obtain a ground plane to estimate polarization parameters, including the refractive index at various locations in the image, where the refractive index is used in physical model calculations regarding the targets and the scene.

The state estimate also provides a region of interest (ROI) cropping that could be used to reduce the polar image compute requirements. For example, by using the previous state data to identify regions of interest (ROIs), the input polarization raw frames and/or preprocessed polarized image data are cropped so that only the selected ROIs are further processed downstream.

In some embodiments, polarized image data is cropped to include only identified ROIs that correspond to tracks. For example, in some embodiments previously-computed tracks including states regarding the positions and velocities of targets (see the dashed line) are supplied as input to the preprocessing operation at 340. These previously computed tracks corresponding to different targets are used to estimate the current position of the target within the polarized image data currently being processed.

More specifically, static targets in static tracks may be assumed to be in the same location as they were during previous steps, in which case regions for interest for those targets may be extracted based on those static locations (e.g., a mapping between the locations specified in the coordinate system of the tracks and projected into the coordinate system of the polarization raw frames, such as based on the calibration of the camera system with respect to the radar system).

Moving targets in dynamic tracks may have a different location in the current polarized image data (e.g., the current polarization raw frames) than the position as specified in the previously computed dynamic tracks. As such, the position of the target as of the timestamp of the polarization raw frame being processed may be estimated based on the position and velocity of the target as specified in the track and the timestamp of the corresponding coordinates of the track (e.g., multiplying the velocity by the difference in timestamps and adding the resulting vector to the position). In a similar manner as with static targets, this estimated position is then be projected to the coordinate space of the polarization raw frames and expanded based on, for example, the size of the target and a buffer area to account for uncertainty in the estimated position.

In some embodiments, the updated states computed at operation 370 (described in more detail below) are provided as input for preprocessing the polarized image data at operation 340 (e.g., to perform cropping of the polarized image data, or other tensors computed based on polarization data, to extract regions of interest) is performed at a different rate than a per-frame basis (e.g., the frame rate of the camera system). For example, in some circumstances, the difference in time between consecutive states in a track may be longer than a time between consecutive frames, in which case there is no need to perform all of the computations associated with updating a region of interest because the input state is the same (e.g., the update of the position of the ROI may merely be updating the current estimated position based on the updated time difference between the timestamp of the state and the timestamp of the current frame).

In addition, in some embodiments different features or tensors extracted from the polarization raw frames during the preprocessing of the polarized image data at operation 340 are computed at rates that are different from the frame rate of the incoming image data, e.g., computed less frequently than on a per-frame basis. For example, some low-level polarization parameters (or constants) change at a different dynamic rate than the rapidly-updating position and kinematic scene data. One such low-level polarization parameter is the refractive index of tracks, which may only need to be when a new track arrives or an existing track changes its classification. Performing these computations on a less frequent basis speeds-up the low-level preprocessing of polarization image data by avoiding performing computations that may be redundant or that may have low marginal benefit.

In some embodiments, regions of interest are extracted from the polarization raw frames by supplying the polarization raw frames to a trained neural network that is trained to extract regions of interest using, for example, an attention mechanism that takes polarization raw frames as input.

Figure 4:
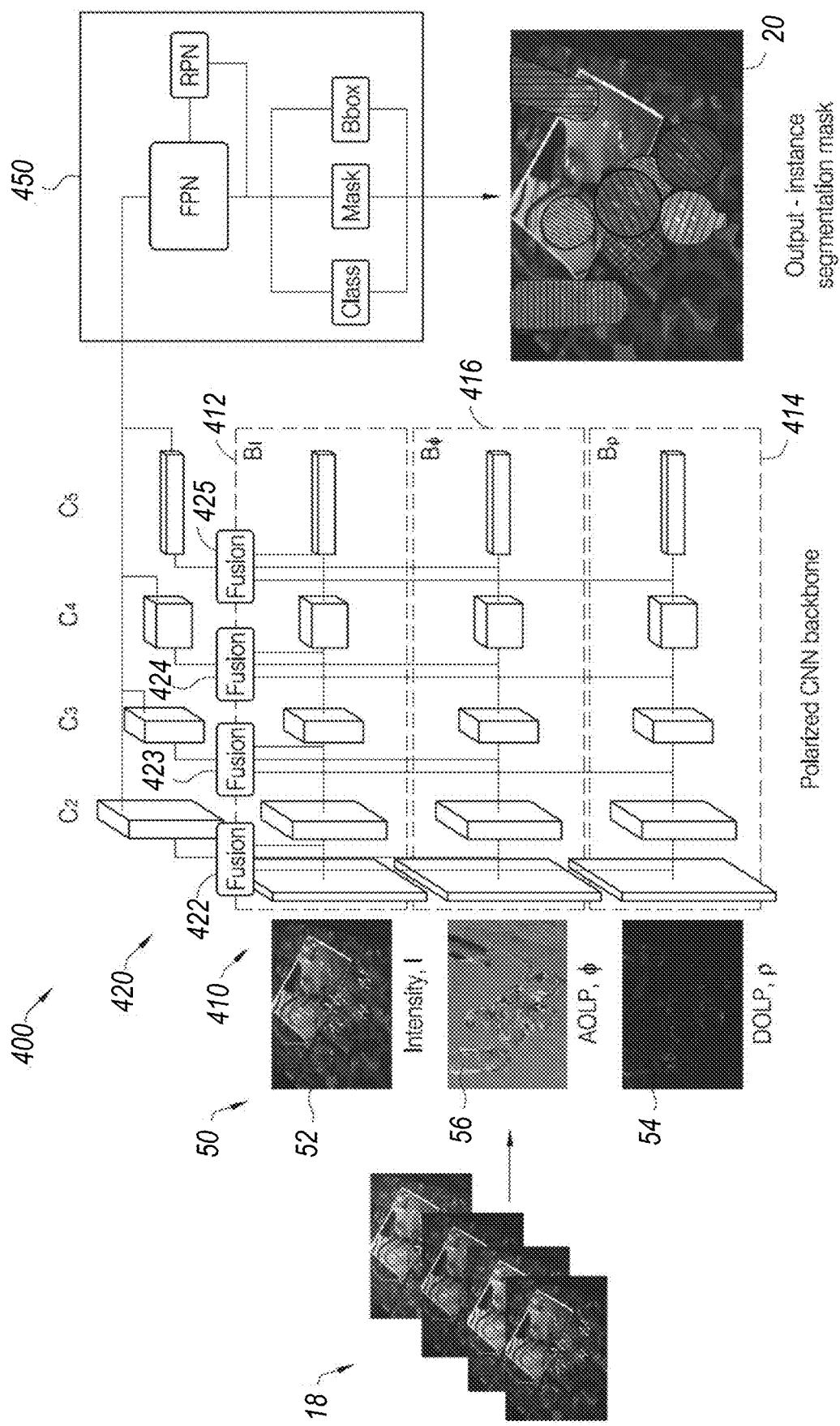
FIG. 4 is a block diagram depicting a Polarized CNN architecture according to one embodiment of the present invention as applied to a Mask-Region-based convolutional neural network (Mask R-CNN) backbone, where second tensors C (or output tensors such as learned feature maps) are used to compute an output feature map or tensor based on input polarized image data.

FIG. 4 is a block diagram depicting a Polarized CNN architecture according to one embodiment of the present invention as applied to a Mask-Region-based convolutional neural network (Mask R-CNN) backbone, where second tensors C (or output tensors such as learned feature maps) are used to compute an output feature map or tensor based on input polarized image data. Additional details regarding a Polarized CNN architecture can be found, for example, in Kalra, Agastya, et al. "Deep polarization cues for transparent object segmentation." *Proceedings of the IEEE/CVF Conference on Computer Vision and Pattern Recognition.* 2020. and in U.S. Pat. No. 11,302,012 "SYSTEMS AND METHODS FOR TRANSPARENT OBJECT SEGMENTATION USING POLARIZATION CUES," issued Apr. 12, 2022, filed as application Ser. No. 17/266,046 on Feb. 4, 2021 as a U.S. national stage entry of PCT Application No. US2020/048604, filed on Aug. 28, 2020, the entire disclosures of which are incorporated by reference herein.

While some embodiments of the present disclosure relate to a semantic segmentation or instance segmentation using a Polarized CNN architecture as applied to a Mask R-CNN backbone, embodiments of the present disclosure are not limited thereto, and other backbones such as AlexNet, VGG, MobileNet, MobileNetV2, MobileNetV3, and the like may be modified in a similar manner.

In the embodiment shown in FIG. 4, derived feature maps 50 (e.g., including input polarization images such as AOLP $\phi$ and DOLP $\rho$ images) are supplied as inputs to a Polarized CNN backbone 410. In the embodiment shown in FIG. 4, the input feature maps 50 include three input images: the intensity image (I) 52, the AOLP ($\phi$) 56, the DOLP ($\rho$) 54 from equation (1) as the input for detecting a transparent object. These images are computed from polarization raw frames 18 (e.g., images $I_0$, $I_{45}$, $I_{90}$, and $I_{135}$ as described above), normalized to be in a range (e.g., 8-bit values in the range [0-255]) and transformed into three-channel gray scale images to allow for easy transfer learning based on networks pre-trained on the MSCoCo dataset (see, e.g., Tsung-Yi Lin, Michael Maire, Serge Belongie, James Hays, Pietro Perona, Deva Ramanan, Piotr Doll'ar, and C Lawrence Zitnick. Microsoft coco: Common objects in context. In European Conference on Computer Vision, pages 740-755. Springer, 2014.).

In the embodiment shown in FIG. 4, each of the input derived feature maps 50 is supplied to a separate backbone: intensity $M_0$ 412, AOLP backbone $B_\phi(\phi)$ 414, and DOLP backbone $B_\rho(\rho)$ 416. The CNN backbones 412, 414, and 416 compute tensors for each mode, or "mode tensors" (e.g., feature maps computed based on parameters learned during training or transfer learning of the CNN backbone, discussed in more detail below) $C_{i,I}$, $C_{i,\rho}$, $C_{i,\phi}$ at different scales or resolutions i. While FIG. 4 illustrates an embodiment with five different scales i, embodiments of the present disclosure are not limited thereto and may also be applied to CNN backbones with different numbers of scales.

Some aspects of embodiments of the present disclosure relate to a spatially-aware attention-fusion mechanism to perform multi-modal fusion (e.g., fusion of the feature maps computed from each of the different modes or different types of input feature maps, such as the intensity feature map I, the AOLP feature map $\phi$, and the DOLP feature map $\rho$).

For example, in the embodiment shown in FIG. 4, the mode tensors $C_{i,I}$, $C_{i,\rho}$, $C_{i,\phi}$ (tensors for each mode) computed from corresponding backbones $B_I$, $B_\rho$, $B_\phi$ at each scale i are fused using fusion layers 422, 423, 424, 425 (collectively, fusion layers 420) for corresponding scales. For example, fusion layer 422 is configured to fuse mode tensors $C_{2,I}$, $C_{2,\rho}$, $C_{2,\phi}$ computed at scale i=2 to compute a fused tensor $C_2$. Likewise, fusion layer 423 is configured to fuse mode tensors $C_{3,I}$, $C_{3,\rho}$, $C_{3,\phi}$ computed at scale i=3 to compute a fused tensor $C_3$, and similar computations may be performed by fusion layers 424 and 425 to compute fused feature maps $C_4$ and $C_5$, respectively, based on respective mode tensors for their scales.

Figure 5:
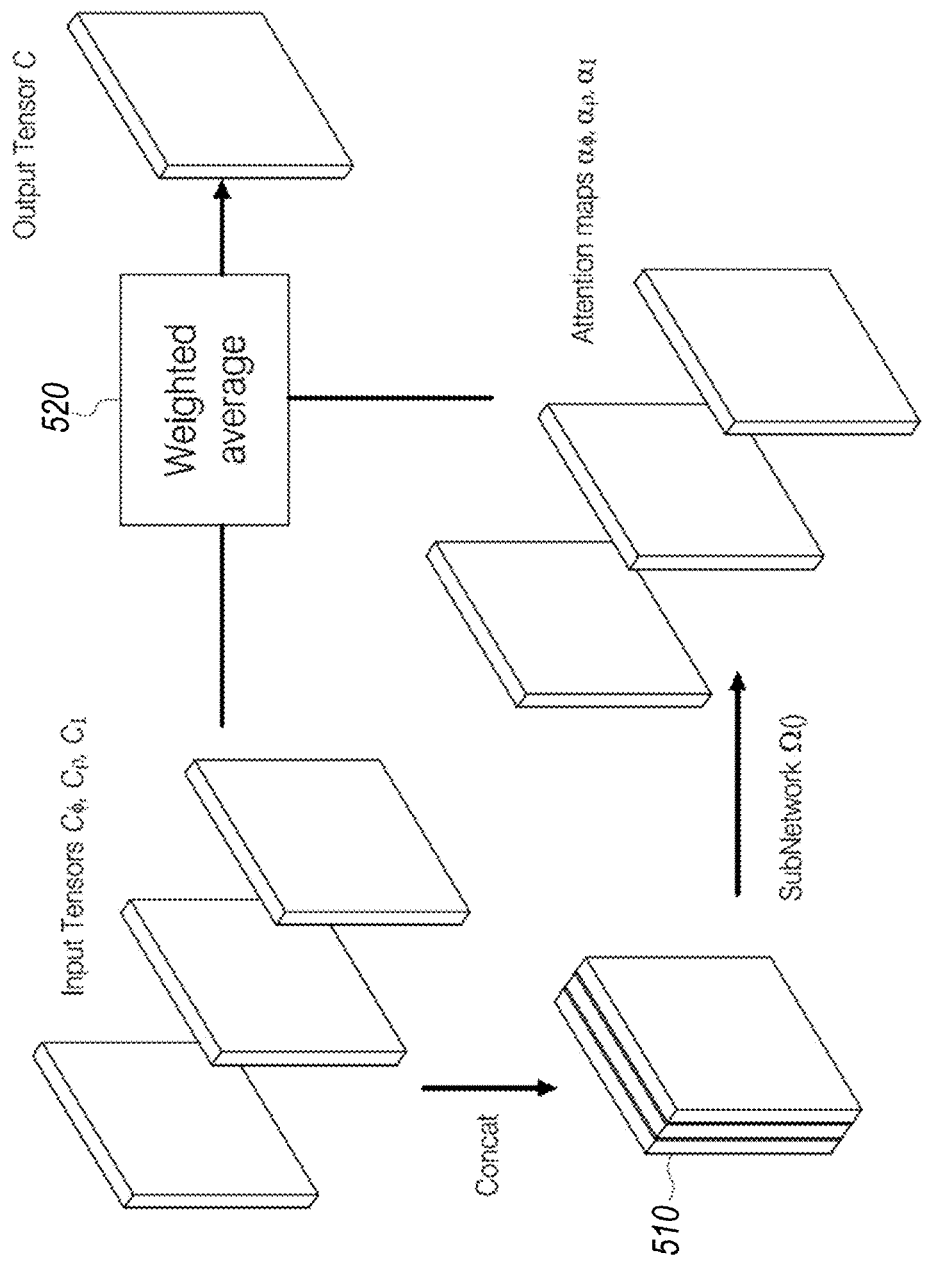
FIG. 5 is a block diagram of an i-th fusion layer among the fusion layers that may be used with a Polarized CNN according to one embodiment of the present invention.

FIG. 5 is a block diagram of an i-th fusion layer among the fusion layers 420 that may be used with a Polarized CNN according to one embodiment of the present invention. As shown in FIG. 5, in some embodiments of the present disclosure, a fusion layer (e.g., each of the fusion layer 420)

is implemented using an attention module, in which the predictor 400 concatenates the supplied input tensors or input feature maps $C_{i,I}$, $C_{i,\rho}$, $C_{i,\varphi}$ computed by the CNN backbones for the i-th scale and to generate concatenated tensor 510, where the concatenated tensor 510 is processed through a set of trained convolutional layers or attention subnetwork $\Omega_i$ for the i-th scale. The attention subnetwork $\Omega_i$ outputs a 3-channel image with the same height and width as the input tensors, and, in some embodiments, a softmax function is applied to each pixel of the 3-channel image to compute pixel-wise attention weights α for the i-th scale:

$$[\alpha_{i,\phi},\alpha_{i,\rho},\alpha_{i,I}]=\text{softmax}(\Omega_i([C_{i,\phi},C_{i,\rho},C_{i,I}])) \quad (6)$$

These attention weights are used to perform a weighted average 520 per channel:

$$C_i=\alpha_{i,\phi}C_{i,\phi}+\alpha_{i,\rho}C_{i,\rho}+\alpha_{i,I}C_{i,I} \quad (7)$$

Accordingly, using an attention module generates attention maps that are used to identify regions of interest (ROIs) in the input polarization tensors C and/or corresponding locations in the polarization raw frames for further processing.

In addition, the fused tensors $C_i$ (e.g., $C_2$, $C_3$, $C_4$, $C_5$), or second tensors, such as fused feature maps, computed by the fusion layers 420 may be supplied as input to a prediction module 450, which is configured to compute a prediction from the fused tensors, where the prediction may be an output such as a segmentation map, a classification, a textual description, or the like. In some embodiments, these predictions of a Polarized CNN are used as a preprocessing of the polarization raw frames generated at operation 340.

The attention maps also allow a Polarized CNN according to some embodiments of the present disclosure to weight the different inputs at the scale i (e.g., the intensity I tensor or learned feature map $C_{i,I}$, the DOLP tensor or learned feature map $C_{i,\rho}$, and the AOLP tensor or learned feature map $C_{i,\varphi}$ at scale i) based on how relevant they are to a given portion of the scene, where the relevance is determined by the trained attention subnetwork $\Omega_i$ in accordance with the labeled training data used to train the Polarized CNN backbone, where the weighting may change the output predictions computed by the Polarized CNN backbone.

At operation 350 and operation 360, the radar data and the polarized image data are aligned with one another. The radar system 30 and the polarization camera array system 10 are calibrated with one another, where examples of calibration processes will be described in more detail below. Accordingly, the calibration includes intrinsic and extrinsic parameters of the radar system and the cameras of the polarization camera array system. At operations 350 and 360, the processing system 100 applies these intrinsic and extrinsic parameters to transform that preprocessed radar data (e.g., the tracks) and the preprocessed polarized image data (e.g., features and tensors extracted from the polarization raw frames and/or filtered or unfiltered versions of the polarization raw frames) from corresponding native or internal coordinate systems (e.g., centered at the physical locations of the individual cameras and the/or the antenna system) and to a common coordinate system shared by the sensors of the sensing system 5.

At operation 370, the processing system 100 fuses the polarized image data captured by the polarization camera system and the radar data captured by the radar system to generate one or more processing outputs.

According to some embodiments, the fusion between the polarized data and the radar data is performed in accordance with a filtering algorithm. For instance, a Kalman filter (see, e.g., Welch, Greg, and Gary Bishop. "An introduction to the Kalman filter." Dept. Comput. Sci., Univ. North Carolina, Chapel Hill, Tech. Rep. 95-041) can be used with state variables that represent positional and kinematic coordinates. In some circumstances, the radar data, in the form of radar tracks, represent the state of the Kalman filter directly and the radar data can be used to perform the measurement update to update the state of the Kalman filter, thereby tracking the current estimated state (e.g., position and velocity) of a target based on potentially noisy radar data input (e.g., noisy radar track data).

Figure 6:
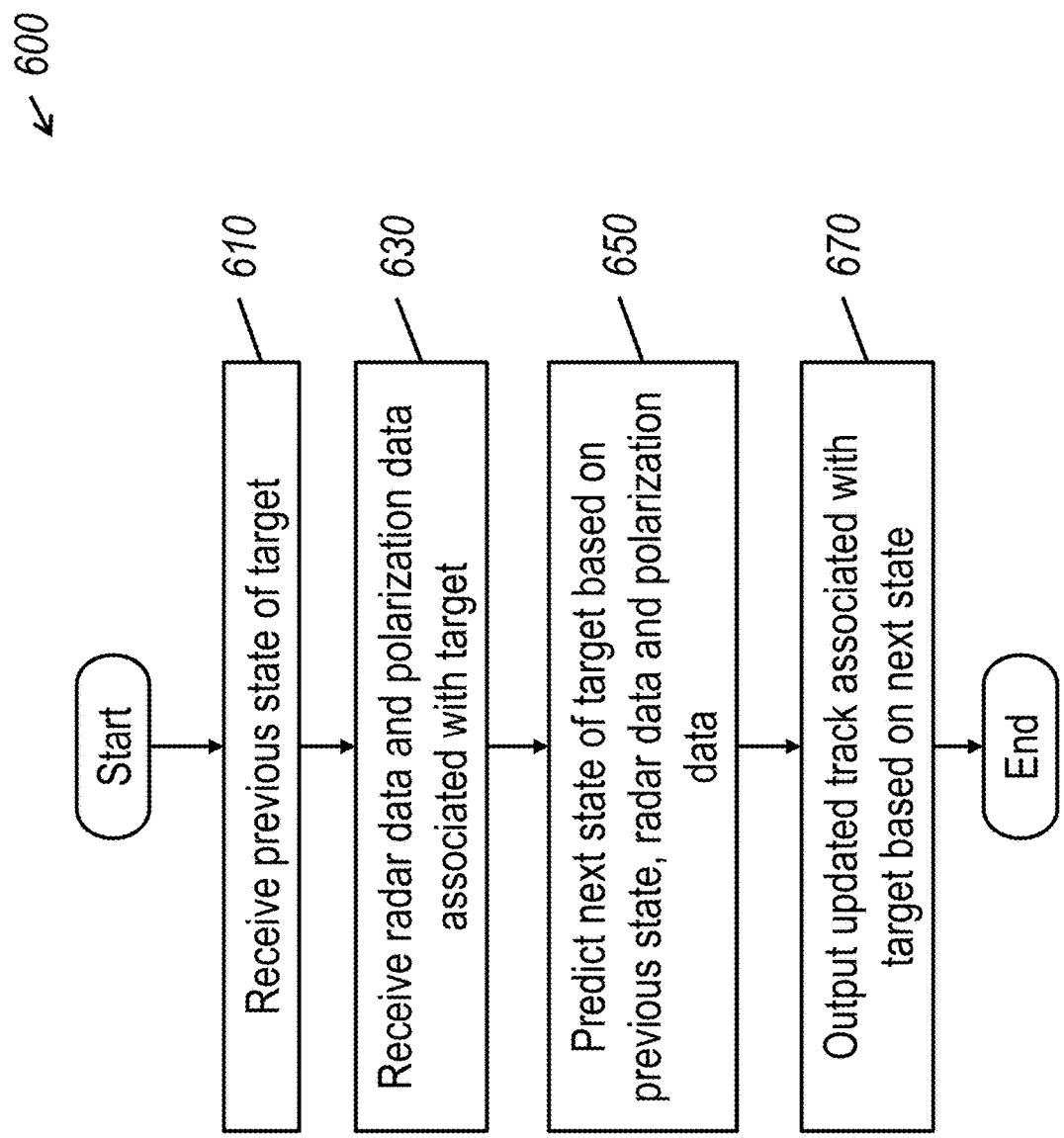
FIG. 6 is a flowchart of a method for computing a predicted updated state of a Kalman filter from a previous state and based on radar data and polarization data according to one embodiment of the present disclosure.

FIG. 6 is a flowchart of a method for computing a predicted updated state of a Kalman filter from a previous state and based on radar data and polarization data according to one embodiment of the present disclosure. Referring to FIG. 6, at operation 610, the processing system 100 receives a previous state of a Kalman filter, where the state corresponds to a particular target (e.g., the positional coordinates and the velocity coordinates of the target). At operation 630, the processing system 100 receives radar data and polarization data associated with the target. The radar data may include the radar track associated with the target, as produced by the radar system 30 and/or as preprocessed at operation 320, and the polarization data may include the polarization raw frames and/or features or tensors computed from the polarization raw frames, such as AOLP, DOLP, shape (e.g., direction of surface normals), and other feature maps or tensors extracted from the polarization raw frames.

At operation 650, the processing system 100 performs a predictive update of the state of the Kalman filter based on the previous state, the current radar data, and the current polarization input (e.g., polarization raw frames and/or features extracted from the polarization raw frames, such as AOLP and DOLP and features or tensors computed by a neural network). In some embodiments, image processing based on polarized optical flow, in other words optical flow as applied to portions of the polarization raw frames corresponding to the target, is used to estimate the position and velocity of the target, and the predictive update of the state is further computed based on the position and velocity as estimated using optical flow (see, e.g., Horn, Berthold K P, and Brian G. Schunck. "Determining optical flow." *Artificial intelligence* 17.1-3 (1981): 185-203.) where the optical flow may be computed based on a classical image processing technique or using a trained neural network (see, e.g., Dosovitskiy, Alexey, et al. "FlowNet: Learning Optical Flow with Convolutional Networks." *Proceedings of the IEEE International Conference on Computer Vision.* 2015.). In some embodiments, the update is further performed based on current image-based input (e.g., non-polarized image data captured by one or more non-polarized cameras of the camera system).

The addition of polarized input enables the predictive updates to be performed in the presence of glare, fine-scale geometry, and more. In some embodiments, the predictive update makes use of polarized optical flow algorithms and polarized deep learning algorithms for shape estimation.

In some embodiments, the output of a predictive update performed at operation 650 is granularized into one or more buffers or one or more different outputs. As shown in FIG. 3, these outputs may be fed back as input to preprocessing of radar data at operation 320 and preprocessing of polarized image data at operation 340.

In some embodiments, the outputs are provided to one or more buffers (e.g., locations in a memory of the processing system 100) that store these outputs. In some embodiments, one of the outputs is the state variable of the Kalman filter, which may correspond to the radar track. This reduces the high-resolution polarimetric prediction to the realm of low-resolution radar tracking, which may be useful in applications where the polarization data is used primarily to enhance radar data. For example, polarized image data may be used to perform predictions in circumstances where radar data may be temporarily unavailable or particularly unreliable (e.g., due to glare or electromagnetic interference in the frequency band of the radar beam), thereby allowing accurate state predictions to be made, even without a radar track available.

In some embodiments, the processing system 100 further computes additional outputs (stored in additional buffers) that provide additional information beyond the state variable of the Kalman filter (e.g., more than merely position coordinates and velocity coordinates) computed based on the fusion of radar data and camera data.

In some embodiments, one additional output is a higher-resolution buffer output that includes a 3-D model (such as a point cloud or surface mesh model) of the target, where the point cloud or surface mesh model is computed based on depth information computed from a stereo polarization camera system (e.g., a stereo polarization camera array system 10 such as that shown in FIG. 1A, FIG. 2A, FIG. 2B, and FIG. 2C). In addition, a buffer may store shape information regarding the target may be computed based on the polarization information (e.g., using the AOLP and DOLP tensor maps of a crop around the target, as computed based on shape from polarization). The shape of the target may also be represented as a shape map, e.g., a two dimensional feature map where each location in the feature map specifies the surface normal direction of the target at that location.

In some embodiments, the processing system further computes an orientation or pose of the target object with respect to the sensing system 5. For example, computing a six-degree-of freedom (6DoF) pose of an object may be useful in applications such as robotic pick-and-place, where the six degrees of freedom include three-dimensional translational coordinates (e.g., in Cartesian coordinates or in spherical or cylindrical polar coordinates) and three-dimensional orientation coordinates (e.g., yaw, pitch, and roll of the target). Combining radar with stereo polarization (and, in some embodiments, multi-viewpoint polarization imaging, such as in the case of where the polarization camera array system 10 includes additional cameras located at additional different viewpoints with respect to the scene) enables the system to compute the poses of targets detected within the field of view of the sensing system 5.

Figure 7:
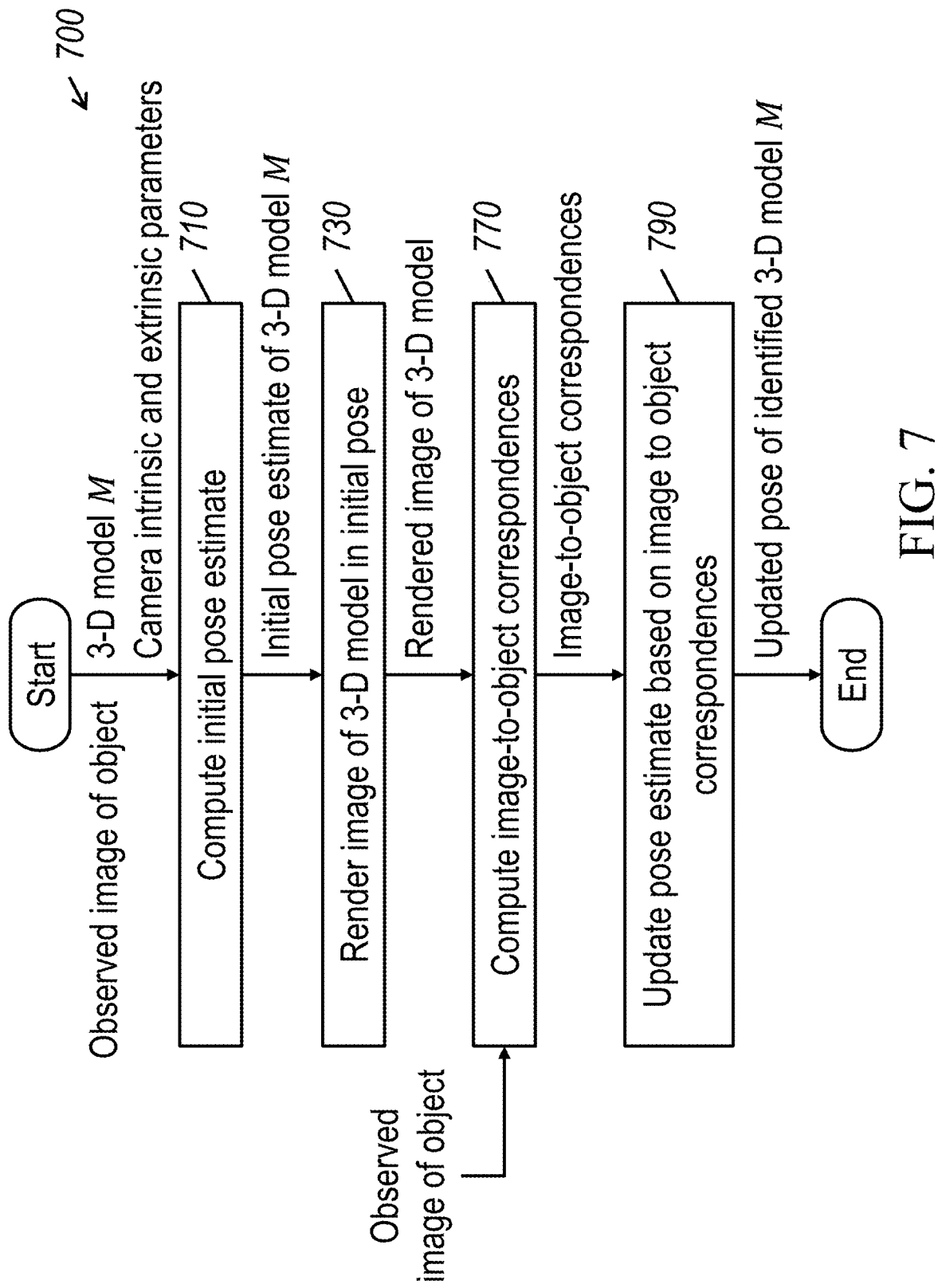
FIG. 7 is a flowchart depicting a general pipeline for computing six-degree-of-freedom (6-DoF) poses of objects according to some embodiments of the present disclosure.

FIG. 7 is a flowchart depicting a general pipeline for computing six-degree-of-freedom (6-DoF) poses of objects according to some embodiments of the present disclosure. For the sake of clarity, embodiments of the present disclosure will be described with respect to the estimation of the pose of one object in the scene. However, embodiments of the present disclosure are not limited thereto and include embodiments wherein the processing system 100 estimates the poses of multiple targets or objects in the scene as depicted in the one or more images captured by the polarization camera array system 10 (e.g., where the poses of the multiple objects may be estimated in parallel or jointly in a combined process).

In some embodiments, 6DoF poses of target objects are computed based on the region of interest (ROI) crops of the polarization data. A keypoint detector is applied to the ROI crops of the polarization data.

In operation 710, the processing system 100 computes an initial pose estimate of a target or object based on one or more images of the object, such as the image patches extracted in operation ROI crops extracted during preprocessing of the camera data in operation 340. The processing system 100 may also supply the ROI crops to a trained neural network (such as a Polarized CNN) that is trained to classify the ROI crops (or, for example, instance segmentation may be applied to the entire frame before cropping) based on the type of the target depicted therein (e.g., to classify the object as a particular model of a car or a particular part that is expected to appear in a manufacturing environment). Alternatively, the classification of the target may already be known (e.g., it is known that all target objects will be of the same class). A 3-D model representing an instance of the class of the target object may then be rendered from the perspective of each of the viewpoints of the camera system. The processing system 100 loads the appropriate 3-D model corresponding to the detected object (e.g., as determined based on a classification of the target based on its appearance) where the 3-D model is posed (e.g., translated and rotated) based on the initial pose estimate.

In some embodiments, the initial pose estimate is computed based on detecting keypoints in the one or more images of the object and using a Perspective-n-Point algorithm to match the detected keypoints with corresponding known locations of keypoints in the 3-D model. See, e.g., Zhao, Wanqing, et al. "Learning deep network for detecting 3D object keypoints and 6D poses." *Proceedings of the IEEE/CVF Conference on Computer Vision and Pattern Recognition.* 2020. and Lepetit, Vincent, Francesc Moreno-Noguer, and Pascal Fua. "EPnP: An accurate O(n) solution to the PnP problem." *International Journal of Computer Vision* 81.2 (2009): 155. The keypoints may be detected using, for example, a classical keypoint detector (e.g., scale-invariant feature transform (SIFT), speeded up robust features (SURF), gradient location and orientation histogram (GLOH), histogram of oriented gradients (HOG), basis coefficients, Haar wavelet coefficients, and the like.) or a trained deep learning keypoint detector such as a trained convolutional neural network using HRNet (Wang, Jingdong, et al. "Deep high-resolution representation learning for visual recognition." *IEEE transactions on pattern analysis and machine intelligence* (2020).) with a differential spatial to numerical (DSNT) layer and Blind Perspective-n-Point (Campbell, Dylan, Liu, and Stephen Gould. "Solving the Blind Perspective-n-Point Problem End-To-End With Robust Differentiable Geometric Optimization." *European Conference on Computer Vision*. Springer, Cham, 2020.).

As another example, the initial pose estimate may be computed by capturing a depth image or depth map of the object (e.g., using a stereo depth camera or time of flight depth camera) and applying an iterative closest point (ICP) algorithm or a point pair feature matching algorithm (see, e.g., Drost, Bertram, et al. "Model globally, match locally: Efficient and robust 3D object recognition." 2010 *IEEE Computer Society Conference on Computer Vision and Pattern Recognition*. IEEE, 2010.) to align the 3-D model to the shape of the object as it appears in the depth image. In some embodiments, the initial pose estimate is computed directly from a trained network (see, e.g., Xiang, Yu, et al. "PoseCNN: A convolutional neural network for 6D object pose estimation in cluttered scenes." *arXiv preprint arXiv: 1711.00199* (2017).) and/or approaches such as a dense pose object detector (Zakharov, Sergey, Ivan Shugurov, and Slobodan Ilic. "DPOD: 6D Pose Object Detector and Refiner." 2019 *IEEE/CVF International Conference on Computer Vision (ICCV)*. IEEE Computer Society, 2019.)

In operation 730, the processing system 100 uses a renderer (or rendering engine) to render an image (e.g., a 2-D image) of the 3-D model in its initial pose from the viewpoint of a camera (e.g., based on extrinsic camera parameters) that captured an image of the object in the scene. In embodiments in which multiple consistent images of the object were captured from multiple viewpoints, the processing system 100 renders a separate image of the 3-D model in its initial estimated pose in the scene observed by the cameras from each of the separate viewpoints with respect to the object in the scene. The rendering may also be performed in accordance with camera intrinsic parameters (e.g., accounting for field of view and lens distortions of the camera or cameras used to capture the observed images of the object in the scene).

In some embodiments of the present disclosure, the rendered image of the object is a rendered surface normals map, where each pixel or point in the rendered surface normals map is a vector indicating the direction of the surface of the 3-D model depicted at that pixel or point (e.g., a vector perpendicular to the surface of the object at that pixel or point). In some cases, the normal vector at each pixel is encoded in the color channels of an image (e.g., in red, green, and blue color channels). In some embodiments, the processing system 100 renders the rendered surface normals map by computing a depth map from the perspective or viewpoint of the observing camera used to capture the observed image (e.g., using the Moller-Trumbore ray-triangle intersection algorithm as described in Wöller, Tomas, and Ben Trumbore. "Fast, minimum storage ray-triangle intersection." *Journal of graphics tools* 2.1 (1997): 21-28.). According to these embodiments, the depth map of the object is converted to a point cloud, and a rendered surface normals map is computed from the point map (e.g., by computing the slope between neighboring or adjacent points of the point cloud).

In some embodiments of the present disclosure, the processing system 100 renders the rendered surface normals map directly from 3-D model with a virtual camera placed at the perspective or viewpoint of the observing camera. This direct rendering may be performed by tracing rays directly from the virtual camera into a virtual scene containing the 3-D model in its initial estimated pose and computing the surface normal of the first surface that each ray intersects with (in particular, the surfaces of the 3-D model in the initial estimated pose that the rays intersect with).

While the rendered image in the embodiments described above include one or more rendered surface normals maps, embodiments of the present disclosure are not limited thereto and the renderer may be configured to generate different types of rendered 2-D images such as color (e.g., red, green, blue) images, monochrome images, and the like.

In operation 770, the processing system 100 computes dense image-to-object correspondences between the one or more images of the object and the 3-D model of the object. For example, the rendered image of the object in the scene based on the initial estimated pose and observed image of the object in the same scene (or multiple rendered images and multiple observed images from different viewpoints) are supplied to a correspondence calculator, which computes correspondence features between the rendered image and the observed image (or the rendered images and the corresponding observed images of the object in the scene).

In various embodiments, the correspondence calculator may use different techniques to compute correspondence features between the rendered image and the observed image. In some embodiments, a disparity neural network is used to detect correspondences (see, e.g., Xu, Haofei, and Juyong Zhang. "AANet: Adaptive aggregation network for efficient stereo matching." *Proceedings of the IEEE/CVF Conference on Computer Vision and Pattern Recognition.* 2020.), where the disparity neural network is modified to match pixels along the y-axis of the images (e.g., perpendicular to the usual direction of identifying correspondences by a disparity neural network) in addition to along the x-axis of the input images (as traditional, where the input images are rectified to extend along the x-axis between stereo pairs of images), where the modification may include flattening the output of the neural network before supplying the output to the loss function used to train the disparity neural network, such that the loss function accounts identifies and detects disparities along both the x-axis and the y-axis. In some embodiments, an optical flow neural network is trained and/or retrained to operate on the given types of input data (e.g., observed surface normals maps and observed images), where examples of optical flow neural networks are described in Dosovitskiy, Alexey, et al. "FlowNet: Learning optical flow with convolutional networks." *Proceedings of the IEEE international conference on computer vision.* 2015. Ilg, Eddy, et al. "FlowNet 2.0: Evolution of optical flow estimation with deep networks." *Proceedings of the IEEE conference on computer vision and pattern recognition.* 2017. and Trabelsi, Ameni, et al. "A Pose Proposal and Refinement Network for Better 6D Object Pose Estimation." *Proceedings of the IEEE/CVF Winter Conference on Applications of Computer Vision.* 2021. In some embodiments, classical techniques for computing correspondences are be used, such as classical algorithms for computing optical flow (see, e.g., Horn and Schunck, referenced above) or classical techniques for computing disparity (e.g., block matching, but applied along both the x-axis and y-axis). Other embodiments of the present disclosure include modifications and/or retraining of existing neural network backbones to take two inputs (e.g., the observed image and the rendered image) to compute correspondences.

To compute the pose, the processing system 100 iteratively updates the position and orientation of the 3D model in virtual space until the appearance of the keypoints of the 3D model match those of the keypoints of the captured crops from multiple viewpoints. In more detail, in operation 790, the processing system 100 updates the estimated pose based on the image-to-object correspondences. For example, the image-to-object correspondences may be supplied to a Perspective-n-Point (PnP) algorithm to compute a refined pose estimate. In some embodiments, the PnP algorithm estimates the refined pose P by finding the pose P that minimizes the error function below:

$$\operatorname*{argmin}_{P} \sum_{x \in X} \|KPf(x) - x\|$$

where K is the camera intrinsic matrix of the camera used to capture the observed image of the object, P is a pose matrix representing the transformation between the object and the camera, $f: \mathbb{N}^2 \to \mathbb{R}^3$ is the image-to-object correspondences described above (computed in operation 770) mapping from pixel coordinates in the observed image to 3-D coordinates on the surface of the 3-D model, and X is the domain of f (e.g., across all of the pixels in the observed image of the object).

Examples of techniques for computing 6DoF poses of objects based on polarization data are described in more detail, for example, in U.S. Pat. No. 11,295,475, "SYSTEMS AND METHODS FOR POSE DETECTION AND MEASUREMENT," filed in the United States Patent and Trademark Office as application Ser. No. 17/420,992 on Jul. 6, 2021 as the US National Stage of PCT Patent Application No. US2021/015926, filed on Jan. 29, 2021 and in U.S. patent application Ser. No. 17/314,929, "SYSTEM AND METHOD FOR USING COMPUTER VISION TO PICK UP SMALL OBJECTS," filed in the United States Patent and Trademark Office on May 7, 2021, the entire disclosures of which are incorporated by reference herein.

In some embodiments, the processing system 100 uses the multiple sensing modes of radar and polarized imaging to correct for asymmetric distortions, where a track visible in the radar stream may not be visible in the polarized image data stream (e.g., due to bad weather), or vice versa (e.g., due to temporary electromagnetic interference or glare). In such cases, when the processing system 100 detects that a target may be subject to asymmetric distortion, performance may degrade (e.g., the computed state may be less accurate), and the processing system 100, in some embodiments, compensates by applying techniques such as prior-based reprocessing in the data fusion at operation 370 during preprocessing at operations 320 and 340. For example, in the case where the radar track is not available, but the polarization data is available, in some embodiments the processing system computes an estimate of the expected a radar track at a particular spatial location, where Bayesian techniques of image processing are applied to enhance the radar track and to identify the missing information (e.g., the estimated position and velocity).

In some embodiment, the radar information and the polarized image information are provided as inputs to a trained neural network, such as a convolutional neural network, that is trained based on polarized image data (e.g., tensors or feature maps extracted from polarization raw frames) and radar data (e.g., the preprocessed radar data and/or radar images synthesized through waveform inversion) to compute feature maps and/or segmentation maps regarding the targets detected in the field of view of the sensing system 5. For example, in some embodiments the radar data is provided as an additional channel of input to a convolutional neural network that is trained to classify targets (and/or perform instance segmentation) based on a combination of the polarized image data and the radar data.

At operation 670, the processing system 100 outputs an updated track associated with the target based on predicted next state, such as by outputting the next state computed at 650 to a buffer that stores the states of the track associated with the target and by outputting other computed information about the targets (e.g., 6DoF pose, shape, point clouds, 3D mesh modes, material classifications, etc.) to output buffers. In various embodiments of the present disclosure, these processing outputs are provided to downstream applications. In some embodiments, the downstream applications perform further processing on the output of the processing system 100, where the further processing may be specific to the particular use case.

One example of a downstream application includes, for example, pick and place robots for controlling the picking of objects and placement of those objects on other locations (e.g., where radar may improve the ability of the sensing system 5 to track parts that may be moving on a conveyor system such that a robotic system can successfully pick the moving part). Another example of a downstream application includes personal mobility and autonomous vehicles, where a sensing system 5 detects and classifies moving and static objects in the environment surrounding the vehicle in order to provide context for path planning, collision avoidance, navigation, and the like, where the fusion of radar with polarization imaging enables high resolution information to be captured (e.g., higher resolution than radar alone) and polarization enables the detection of features that may otherwise be invisible (e.g., matte or dark objects, glare, highly reflective objects, transparent objects, and the like).

Calibration of Radar System and Camera System

In exemplary reductions of practice, it is desirable to find a common coordinate space between the radar system (e.g., the antenna system of the radar) and the polarization camera array system (e.g., the individual cameras of the polarization camera array and the camera array as a whole). This will require both extrinsic and intrinsic calibration of both the radar system and the polarization camera array system.

Some aspects of embodiments of the present disclosure relate to a camera array that includes multiple cameras that are calibrated with respect to one another and also calibrated with respect to the radar sensor. Here, calibration involves determining mappings between pixels of images in different cameras (different cameras having different modalities or spectra) of the camera array and the radar sensor, where camera calibration (also referred to as geometric camera calibration, camera resectioning, or camera registration) refers to a process of determining intrinsic and extrinsic parameters of a camera to associate points in a camera's image space (e.g., the locations in the pixels) and the radar image space (e.g., locations within the field of view of the radar sensor) with an external 3D world space.

The intrinsic parameters generally encompass internal camera parameters such as the focal length, image sensor format, and principal point, as well as lens distortion and analogous characteristics of the radar system.

The extrinsic parameters denote the 3D position and rotation of the camera with respect to 3D world coordinates, and analogous characteristics of the radar system. The extrinsic parameters may be also be referred to as the "pose" of the camera or the radar system antenna array with respect to a shared coordinate system of the sensing system 5.

These intrinsic and extrinsic parameters are commonly represented in a 3×4 matrix referred to generally as a camera matrix, although the parameters may similarly be calculated for a radar sensor. A set of cameras and a radar sensor may be referred to as being calibrated when the intrinsic and extrinsic parameters of those cameras are known. In particular, a processing circuit automatically transforms images captured by the different cameras to a common coordinate space (e.g., the coordinate space of a designated main camera or a coordinate space of the radar sensor) using the intrinsic and extrinsic parameters of the cameras used to capture those images. This enables the automatic alignment of the pixels of those images and alignment of the radar data with the images (e.g., at operations 350 and 360 as shown in FIG. 3). In general, the cameras of a camera array are rigidly fixed together to maintain the accuracy of their calibrated extrinsic parameters with respect to one another and an antenna or antenna array (antenna system) of the radar sensor may also be rigidly fixed together with the camera array. Disparity or parallax shifts due to differences in the positions of the cameras within a camera array may be mitigated or minimized in some embodiments based on relatively close spacing between the cameras of the camera array and based on assumptions regarding a minimum distance to objects imaged in a scene.

Figure 8:
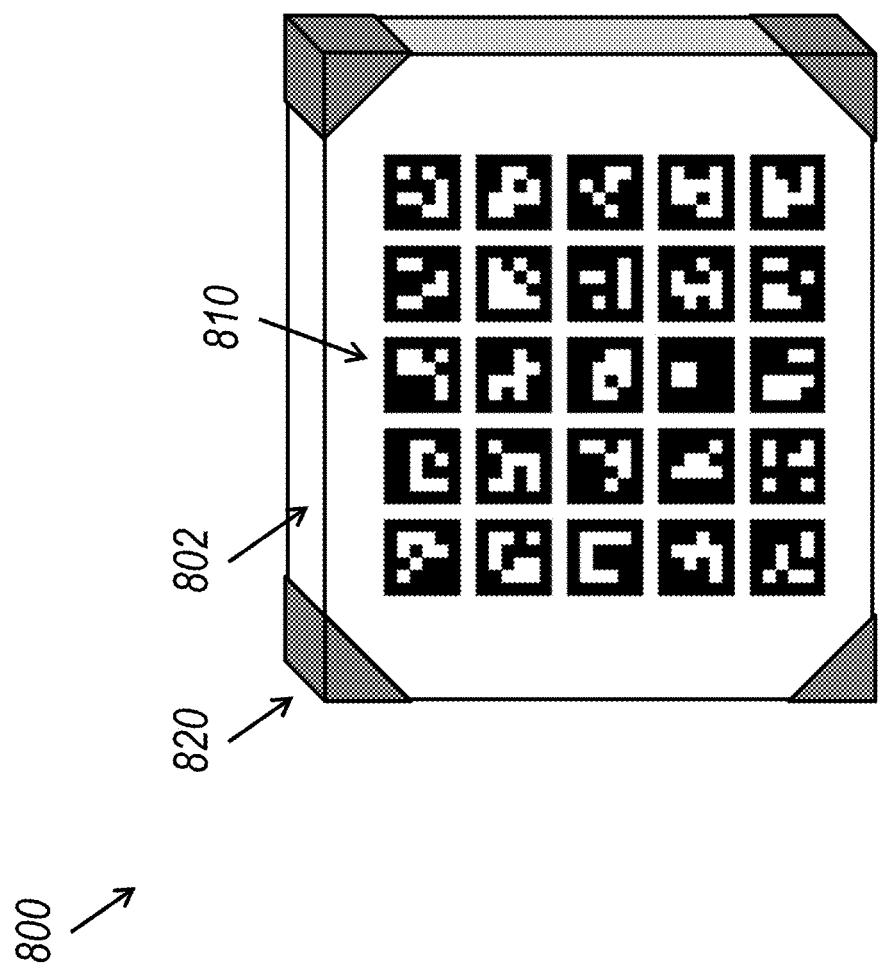
FIG. 8 depicts one example of a calibration target object having diversity in its reflectance characteristics for both camera and radar based sensing according to one embodiment of the present disclosure.

Some aspects of embodiments relate to target-based calibration of a radar system and a camera system of a sensing system. Some embodiments relate to the use of a calibration target object that has diversity in its reflectance characteristics. FIG. 8 depicts one example of a calibration target object 800 having diversity in its reflectance characteristics for both camera and radar based sensing according to one embodiment of the present disclosure. A calibration target object may include, for example, a foam reflector 802 with a checkerboard color texture 810 (e.g., a ChAruCo board as shown in FIG. 8, but not limited thereto) that provides image-based contrast for a camera system and metallic corner reflectors 820 that provide contrast for a radar system.

To perform the calibration, the processing system 100 solves a geometric system of equations based on the intrinsic and extrinsic parameters. Further, in some embodiments, the checkerboard exhibits a polarization dependent texture from the dielectric and non-dielectric surfaces. In general, calibration is not restricted to two sensors as it can be done with respect to a general number of sensors by selecting a consistent reference sensing space.

Some aspects of embodiments further relate to target-less calibration. Target-less calibration relies on obtaining the intrinsic parameters and extrinsic parameters without the use of a calibration target. This can be done by collecting a map of the environment or scene 1 around the sensing system (e.g. in one embodiment, Structure from Motion (SfM) is used on the polarization images to generate the map of the environment or scene). With this map, radar scans are then aligned to the map through, for example, a non-linear least square algorithm (or other technique), enabling extrinsic calibration of the radar system to the polarimetric camera array system.

Accordingly, aspects of embodiments of the present disclosure relates to sensor fusion of polarization camera data and radar sensor data. The polarization of light enables sensing systems according to embodiments of the present disclosure to detect targets in the presence of glare, to detect metallic objects, and capture high-resolution 3D shapes of targets. In addition, polarization is less sensitive to issues of dynamic range, which leads to an increase in drivable area segmentation. In addition, polarization is robust to print-out attacks (e.g., color photographs of objects), enabling more robust object detection in the presence of signs or pictures in a scene (e.g., billboard advertisements depicting photographs of cars that would be confusing to imaging systems that do not include polarization cameras). Polarization also enables detection of road surface anomalies (e.g., cracks and potholes) that would otherwise be difficult to detect without polarization, and the fusion of polarization data with radar data provides capabilities that, in some cases, can meet or exceed the performance of comparable systems such as LiDAR.

It should be understood that the sequence of steps of the processes described herein in regard to various methods and with respect various flowcharts is not fixed, but can be modified, changed in order, performed differently, performed sequentially, concurrently, or simultaneously, or altered into any desired order consistent with dependencies between steps of the processes, as recognized by a person of skill in the art.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A sensor system comprising:
   a radar system configured to emit a radar beam and receive reflected radar signals from in a field of view of the radar system;
   a camera system comprising a plurality of cameras, including a first camera having a first linear polarization filter at a first angle of linear polarization, a second camera having a second linear polarization filter at a second angle of linear polarization, and a third camera having a third linear polarization filter at a third angle of linear polarization, wherein a field of view of the camera system overlaps the field of view of the radar system; and
   a processing system comprising a processor and memory, the memory storing instructions that, when executed by the processor, cause the processor to:
   receive radar data based on the reflected radar signals captured by the radar system;
   receive polarization raw frames captured by the camera system;
   compute a region of interest based on the radar data;
   crop the polarization raw frames to the region of interest; and
   compute a pose of a target based on the cropped polarization raw frames.

2. The sensor system of claim 1, wherein the memory stores instructions that, when executed by the processor, cause the processor to:
   compute a track of the target based on a Kalman filter having a state comprising positional coordinates and kinematic coordinates of the target; and
   perform a predictive update of the state based on the radar data, the polarization raw frames, and a previous state.

3. The sensor system of claim 2, wherein the instructions to perform the predictive update of the state comprise instructions that, when executed by the processor, cause the processor to:
   compute polarized optical flow of the target based on the polarization raw frames; and
   perform the predictive update based on the polarized optical flow.

4. The sensor system of claim 2, wherein the instructions to perform the predictive update of the state comprise instructions that, when executed by the processor, cause the processor to:
   compute a shape estimate of the target based on supplying the polarization raw frames to a trained deep neural network; and
   perform the predictive update based on the shape estimate.

5. The sensor system of claim 1, wherein the memory further stores instructions that, when executed by the processor, cause the processor to compute shape data of the target based on the cropped polarization raw frames.

6. The sensor system of claim 1, wherein the memory further stores instructions that, when executed by the processor, cause the processor to:
   compute a track of a target in the field of view of the camera system and the field of view of the radar system based on the radar data and the polarization raw frames.

7. The sensor system of claim 6, wherein the track of the target is computed based on the radar data and the cropped polarization raw frames.

8. The sensor system of claim 1, wherein the memory further stores instructions that, when executed by the processor, cause the processor to:
compute a 3-D model of the target based on the cropped polarization raw frames.

9. The sensor system of claim 1, wherein the memory further stores instructions that, when executed by the processor, cause the processor to calibrate the radar system and the camera system by:
transmitting the radar beam and receiving reflected radar signals from the field of view of the radar system;
receiving radar data based on the reflected radar signals comprising radar signals reflected by a calibration target;
receiving polarization raw frames captured by the camera system, the polarization raw frames comprising polarization images of the calibration target;
calibrating the camera system and the radar system based on:
the radar data based on the radar signals reflected by the calibration target; and
the polarization images of the calibration target,
the calibrating the camera system comprising computing:
extrinsic parameters representing a geometric transformation between the field of view of the radar system and the field of view of the camera system.

10. A method for fusing radar data and polarized image data comprising:
receiving, by a processor of a processing system, radar data based on reflected radar signals captured by a radar system configured to emit a radar beam and to detect the reflected radar signals from a field of view of the radar system;
receiving, by the processor, polarization raw frames captured by a camera system comprising a plurality of cameras, including a first camera having a first linear polarization filter at a first angle of linear polarization, a second camera having a second linear polarization filter at a second angle of linear polarization, and a third camera having a third linear polarization filter at a third angle of linear polarization, wherein a field of view of the camera system overlaps the field of view of the radar system;
computing a region of interest based on the radar data;
cropping the polarization raw frames to the region of interest; and
computing, by the processor, a pose of a target based on the cropped polarization raw frames.

11. The method of claim 10, further comprising:
compute a track of the target based on a Kalman filter having a state comprising positional coordinates and kinematic coordinates of the target; and
performing a predictive update of the state based on the radar data, the polarization raw frames, and a previous state.

12. The method of claim 11, wherein the performing the predictive update of the state comprises:
computing polarized optical flow of the target based on the polarization raw frames; and
performing the predictive update based on the polarized optical flow.

13. The method of claim 11, wherein the performing the predictive update of the state comprises:
computing a shape estimate of the target based on supplying the polarization raw frames to a trained deep neural network; and
performing the predictive update based on the shape estimate.

14. The method of claim 10, further comprising computing shape data of the target based on the cropped polarization raw frames.

15. The method of claim 10, further comprising computing a track of a target in the field of view of the camera system and the field of view of the radar system based on the radar data and the polarization raw frames.

16. The method of claim 15, wherein the track of the target is computed based on the radar data and the cropped polarization raw frames.

17. The method of claim 10, further comprising computing a 3-D model of the target based on the cropped polarization raw frames.

* * * * *